United States Patent
Cragun et al.

(10) Patent No.: US 11,537,993 B2
(45) Date of Patent: *Dec. 27, 2022

(54) GATHERING AND DISPLAY OF SALES DATA FOR AN IDENTIFIED RESIDENCE VIA A GRAPHICAL USER INTERFACE (GUI) OF A MOBILE SOFTWARE APPLICATION EXECUTING ON A WIRELESS MOBILE COMPUTER DEVICE

(71) Applicant: Vivint, Inc., Provo, UT (US)

(72) Inventors: Jason Cragun, Pleasant Grove, UT (US); Lonnie Kyser, Pleasant Grove, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,863

(22) Filed: Mar. 7, 2022

(65) Prior Publication Data

US 2022/0188772 A1 Jun. 16, 2022

Related U.S. Application Data

(63) Continuation of application No. 17/214,409, filed on Mar. 26, 2021, now Pat. No. 11,270,265, which is a
(Continued)

(51) Int. Cl.
*G06Q 10/10* (2012.01)
*G06Q 30/02* (2012.01)
(Continued)

(52) U.S. Cl.
CPC ....... *G06Q 10/103* (2013.01); *G01C 21/3811* (2020.08); *G01C 21/3867* (2020.08);
(Continued)

(58) Field of Classification Search
CPC .... G06Q 10/103; G06Q 10/047; G06Q 30/02; G06Q 30/0202; G06Q 30/0203;
(Continued)

(56) References Cited

U.S. PATENT DOCUMENTS

| 6,078,892 A | 6/2000 | Anderson et al. |
| 6,125,356 A | 9/2000 | Brockman et al. |

(Continued)

FOREIGN PATENT DOCUMENTS

| JP | 62087492 A | 4/1987 |
| JP | 2002019923 A * | 1/2002 |

(Continued)

OTHER PUBLICATIONS

BenMoussa, "Supporting Salespersons through Location Based Mobile Applications and Services," in Building the E-Service Society, 2004, Springer, pp. 149-167 (Year: 2004).

(Continued)

*Primary Examiner* — Nga X Nguyen
(74) *Attorney, Agent, or Firm* — Maschoff Brennan

(57) ABSTRACT

A computer-implemented method for facilitating the identification of sales targets. The method may include displaying in a graphical user interface ("GUI") an image of a map of a sales region on an electronic display of a mobile device. In some embodiments, the sales region image map is based on a geographic location of the mobile device. The method may also include displaying in the GUI a plurality of selectable icons that are depicted on the map, where each icon corresponds to a geographic location of a potential sales target within the sales region. The method may further include, in response to a selection of a particular one of the plurality of selectable icons, displaying in a location of the
(Continued)

screen a first GUI window that includes sales information associated with the potential sales target associated with the selected icon.

26 Claims, 32 Drawing Sheets

Related U.S. Application Data continuation of application No. 14/335,772, filed on Jul. 18, 2014, now Pat. No. 10,963,840, which is a continuation of application No. 13/026,468, filed on Feb. 14, 2011, now Pat. No. 8,812,345.

(60) Provisional application No. 61/320,641, filed on Apr. 2, 2010.

(51) Int. Cl.
| | |
|---|---|
| *G06Q 30/06* | (2012.01) |
| *G01C 21/00* | (2006.01) |
| *G06F 3/04842* | (2022.01) |
| *G06Q 10/04* | (2012.01) |

(52) U.S. Cl.
CPC ....... *G06F 3/04842* (2013.01); *G06Q 10/047* (2013.01); *G06Q 30/02* (2013.01); *G06Q 30/0202* (2013.01); *G06Q 30/0203* (2013.01); *G06Q 30/0204* (2013.01); *G06Q 30/06* (2013.01)

(58) Field of Classification Search
CPC .......................... G06Q 30/06; G01C 21/3811; G01C 21/3867; G06F 3/04842
See application file for complete search history.

(56) References Cited

U.S. PATENT DOCUMENTS

| | | | |
|---|---|---|---|
| 7,620,564 | B1 | 11/2009 | Lippock |
| 8,433,650 | B1 | 4/2013 | Thomas |
| 8,639,272 | B2 | 1/2014 | Tysowski |
| 8,812,345 | B2 | 8/2014 | Cragun et al. |
| 9,392,038 | B2 | 7/2016 | Robinson |
| 9,581,461 | B1 | 2/2017 | Chintakindi et al. |
| 10,963,840 | B2 | 3/2021 | Crugan et al. |
| 2002/0019699 | A1 | 2/2002 | McCarty |
| 2002/0035504 | A1 | 3/2002 | Dver et al. |
| 2002/0082892 | A1 | 6/2002 | Raffel et al. |
| 2002/0143609 | A1 | 10/2002 | Magouirk |
| 2003/0078788 | A1 | 4/2003 | Sussman |
| 2003/0135402 | A1 | 7/2003 | Moore |
| 2003/0200192 | A1 | 10/2003 | Bell |
| 2005/0114197 | A1 | 5/2005 | Bell |
| 2005/0192831 | A1 | 9/2005 | Ellison et al. |
| 2006/0007174 | A1 | 1/2006 | Shen |
| 2006/0074775 | A1 | 4/2006 | Roman et al. |
| 2006/0101005 | A1 | 5/2006 | Yang et al. |
| 2006/0200383 | A1 | 9/2006 | Arutunian et al. |
| 2006/0242024 | A1 | 10/2006 | Mattingly et al. |
| 2007/0118520 | A1 | 5/2007 | Bliss et al. |
| 2007/0129954 | A1 | 6/2007 | Dessureault |
| 2007/0152041 | A1 | 6/2007 | Hawkins |
| 2007/0219712 | A1* | 9/2007 | Abhyanker .......... G06Q 10/087 701/532 |
| 2007/0229466 | A1 | 10/2007 | Peng et al. |
| 2007/0282650 | A1 | 12/2007 | Jackness et al. |
| 2008/0126244 | A1 | 5/2008 | Loving et al. |
| 2008/0133306 | A1 | 6/2008 | Stirlen |
| 2008/0313239 | A1 | 12/2008 | Byler |
| 2009/0254273 | A1* | 10/2009 | Gill ...................... G09B 29/007 701/431 |
| 2009/0254971 | A1 | 10/2009 | Herz et al. |
| 2009/0322782 | A1 | 12/2009 | Kimchi et al. |
| 2011/0040698 | A1 | 2/2011 | Chang et al. |
| 2011/0224896 | A1 | 9/2011 | Napieraj |
| 2011/0231230 | A1 | 9/2011 | Christon et al. |
| 2011/0296349 | A1 | 12/2011 | Todd et al. |
| 2013/0085809 | A1 | 4/2013 | Muir |
| 2013/0117333 | A1 | 5/2013 | Chimel et al. |
| 2013/0262528 | A1 | 10/2013 | Foit |
| 2013/0325553 | A1 | 12/2013 | Nadiadi et al. |
| 2015/0051835 | A1 | 2/2015 | Jung et al. |
| 2015/0142517 | A1 | 5/2015 | Crugan et al. |
| 2015/0371158 | A1 | 12/2015 | Oberweis et al. |
| 2016/0098598 | A1 | 4/2016 | Pahwa et al. |
| 2017/0300860 | A1 | 10/2017 | Cragun et al. |
| 2021/0142289 | A1 | 5/2021 | Crugan et al. |

FOREIGN PATENT DOCUMENTS

| | | |
|---|---|---|
| KR | 20060065399 A | 6/2006 |
| KR | 100856109 B1 | 8/2008 |

OTHER PUBLICATIONS

U.S. Appl. No. 13/026,468, Apr. 30, 2013, Final Office Action.
U.S. Appl. No. 13/026,468, Dec. 23, 2013, Office Action.
U.S. Appl. No. 13/026,468, May 6, 2014, Notice of Allowance.
U.S. Appl. No. 15/638,154, Jan. 29, 2021, Final Office Action.
U.S. Appl. No. 61/320,641, titled "Door To Door Sales Management Tool" filed Apr. 2, 2010.
U.S. Appl. No. 13/026,468, titled "Door To Door Sales Management Tool" filed Feb. 14, 2011.
U.S. Appl. No. 14/335,772, titled "Door To Door Sales Management Tool" filed Jul. 18, 2014.
U.S. Appl. No. 15/638,154, titled "Door To Door Sales Management Tool" filed Jun. 29, 2017.
U.S. Appl. No. 17/153,777, titled "Door To Door Sales Management Tool" filed Jun. 2021.
Alves et al., "Structural and Optical Studies of Co and Ti Implanted Sapphire," Nuclear Instruments and Methods in Physics Research B 207, 2003, pp. 55-62.
Marquese et al., "Optical Changes Induces by High Fluence Implantation of Au Ions on Sapphire," Nuclear Instruments and Methods in Physics Research B218, 2004, pp. 139-144.
Saito et al., "Coloration of Sapphire by Co Ion Implantation," Nuclear Instruments and Methods in Physics Research B59/60, 1991, pp. 1173-1176.
Saito et al., "Coloration of Sapphire by Co Metal Implantation," Japanese Journal of Applies Physics, vol. 24, No. 11, Nov. 1985, pp. L880-L882.

* cited by examiner

GATHERING AND DISPLAY OF SALES DATA FOR AN IDENTIFIED RESIDENCE VIA A GRAPHICAL USER INTERFACE (GUI) OF A MOBILE SOFTWARE APPLICATION EXECUTING ON A WIRELESS MOBILE COMPUTER DEVICE

CROSS-REFERENCE TO RELATED APPLICATIONS

This application is a continuation of U.S. patent application Ser. No. 17/214,409, filed on Mar. 26, 2021; which is a continuation of U.S. patent application Ser. No. 14/335,772, filed on Jul. 18, 2014, now U.S. Pat. No. 10,963,840, issued on Mar. 30, 2021; which is a continuation of U.S. patent application Ser. No. 13/026,468, filed on Feb. 14, 2011, now U.S. Pat. No. 8,812,345, issued on Aug. 19, 2014; which claims the benefit of U.S. patent application Ser. No. 61/320,641, filed on Apr. 2, 2010; the disclosures of which are incorporated herein by reference in their entireties.

THE FIELD OF THE INVENTION

The present invention relates to navigating a neighborhood using an interactive electronic map displayed on a graphical user interface (GUI) of a mobile software application executing on a wireless mobile computer device.

BACKGROUND

Door to door sales responsibilities are generally separated into geographic regions. Once fully subdivided, each geographical area is given to a sales team. The sales team then gives each salesperson a street or set of streets to work until complete. As there are a finite number of doors, it becomes important to contact as many of the people as possible without becoming a nuisance. Therefore it is important for management to know which houses have been contacted and which have not.

Door to door salespeople, however, have a more immediate motivation to sell. Paperwork is often seen as "in the way" or unimportant compared with moving along to the next door. After all, they will likely receive a new neighborhood to work on after this one has been finished. There is little motivation to provide records that may help the next salesperson through the current neighborhood.

The door to door sales process can be filled with frustrations. A potential customer may fail the credit check at the end of the sales call. Another potential customer may still be under a contract with another company. The current street may have been contacted in the last few months. Most of these frustrations equate with time wasted on poor sales prospects.

Frequently, door to door salespeople use paper to track their contacts. However, paper records are often difficult to read, difficult to review, time consuming to procure, and even contain misstatements. Even when management requires use of the paper records, the records may be filled out at the end of the day with guesses of what happened earlier that morning. The value of the paperwork is not directly related to the motivation of the door to door salesperson's next sale and therefore is given less attention than management would like.

Even with a good paper listing, management must take individual salesperson daily records and compile them into useful information. Not only is this time intensive work, but each salesperson's report is likely to be subjective at best, and fabricated at worst, such that the report must be interpreted by the person compiling the records. This time and fabrication barrier is likely the same barrier to having a salesperson review neighborhood records before selling in that neighborhood.

SUMMARY

In some embodiments, a computer-implemented method of navigating a neighborhood using an interactive electronic map displayed on a graphical user interface (GUI) of a mobile software application executing on a wireless mobile computer device may include various acts. For example, the method may include displaying in a GUI an image of a map of a sales region on an electronic display of a mobile device. In some embodiments, the sales region image map is based on a geographic location of the mobile device. The method may also include displaying in the GUI a plurality of selectable icons that are depicted on the map, where each icon corresponds to a geographic location of a potential sales target within the sales region. The method may further include, in response to a selection of a particular one of the plurality of selectable icons, displaying in a location of the screen a first GUI window that includes sales information associated with the potential sales target associated with the selected icon. The method may also include, in response to the receiving of the selection of the selectable icon, displaying, by the GUI, a name of the occupant. The method may further include displaying, by the GUI, one or more additional current characteristics of the occupant. Other sales information may also be provided in response to the selection of the icon, or by way of sub-reports via successive selections.

In some embodiments, the icons may have visually distinct characteristics that indicate information about the corresponding sales targets. For example, the visually distinct characteristic may indicate a potential sales target that has a higher probability of a sales success than other sales targets. Alternatively, the visual may indicate a sales target that has already been visited, or that is in an unsafe area. Other types of information can also be visually indicated.

In some embodiments, the computer-implemented method may further include initiating, by the mobile software application, a pre-qualification on the first current occupant, and displaying, by the GUI, a result of the pre-qualification.

In some embodiments, the computer-implemented method may further include automatically determining, by the mobile software application, a current geolocation of the wireless mobile computer device using a GPS device of the wireless mobile computer device, and the computer-implemented method further comprises sending, from the mobile software application over a wireless network, the current geolocation to server software application executing on a server. In these embodiments, the receiving of the interactive electronic map at the mobile software application may include receiving the interactive electronic map from the server software application over the wireless network. In these embodiments, the interactive electronic map may include the current geolocation, and the neighborhood may surround the current geolocation.

In another embodiment, a system for facilitating sales is disclosed. The system may include, for example, a database, residing on a server, comprising sales information for a plurality of potential sales targets, where each of the plurality of sales targets is associated with a geographic sales region. The system may further include a plurality of mobile devices that are each associated with a sales associate. In an embodiment, a mobile device may include an electronic display and a geolocation device configured to determine a geographic location of the respective mobile device. In addition, the system may include one or more electronic storage devices having software instructions which, when executed by one or more processors, configure the one or more processors to perform steps. In an embodiment, steps may include receiving over a network by the server a geographic location of a respective one of the plurality of mobile devices. A step may include querying the database by the one or more processors to identify each of the plurality of potential sales targets associated with the geographic sales region within a predetermined distance from the geographic location of the respective mobile device. In an embodiment, a step may then include generating a first graphical user interface ("GUI") at the electronic display of the respective mobile device comprising a map and selectable icons depicted on the map at positions corresponding with the geographic location of the identified potential sales targets. Upon selection of one of the selectable icons, a step of querying the database to retrieve the sales information associated with the potential sales target associated with the selected one of the selectable icons is provided. Also, a step may include displaying in a second GUI, a visualization of the retrieved sales information associated with the potential sales target of the selected icons.

In some embodiments, one or more non-transitory computer-readable media may include one or more computer-readable instructions of a mobile software application that, when executed by a wireless mobile computing device, cause the wireless mobile computing device to perform a method of navigating a neighborhood using an interactive electronic map displayed on a GUI of the mobile software application.

BRIEF DESCRIPTION OF THE DRAWINGS

Various embodiments are shown and described in reference to the numbered drawings, wherein.

It will be appreciated that the drawings are illustrative arid not limiting of the scope of the invention which is defined by the appended claims. The embodiments shown accomplish various aspects and objects. It is appreciated that it is not possible to clearly show each element and aspect of all possible embodiments in a single figure, and as such, multiple figures are presented to separately illustrate various details of individual embodiments of sales management tools and related methods of use in greater clarity. Similarly, not every embodiment need accomplish all advantages or include each detail of the various embodiments contemplated and disclosed herein.

DETAILED DESCRIPTION

Sales management tools and related methods of use will now be discussed in reference to the Figures provided. The drawings and descriptions are exemplary of various embodiments and are not intended to narrow the scope of the appended claims. While the application below discusses sales tools in terms of a residential neighborhood, it is understood that sales tools may be equally applicable in other situations, including commercial, non-profit, and emergency response aspects.

Figure 1:
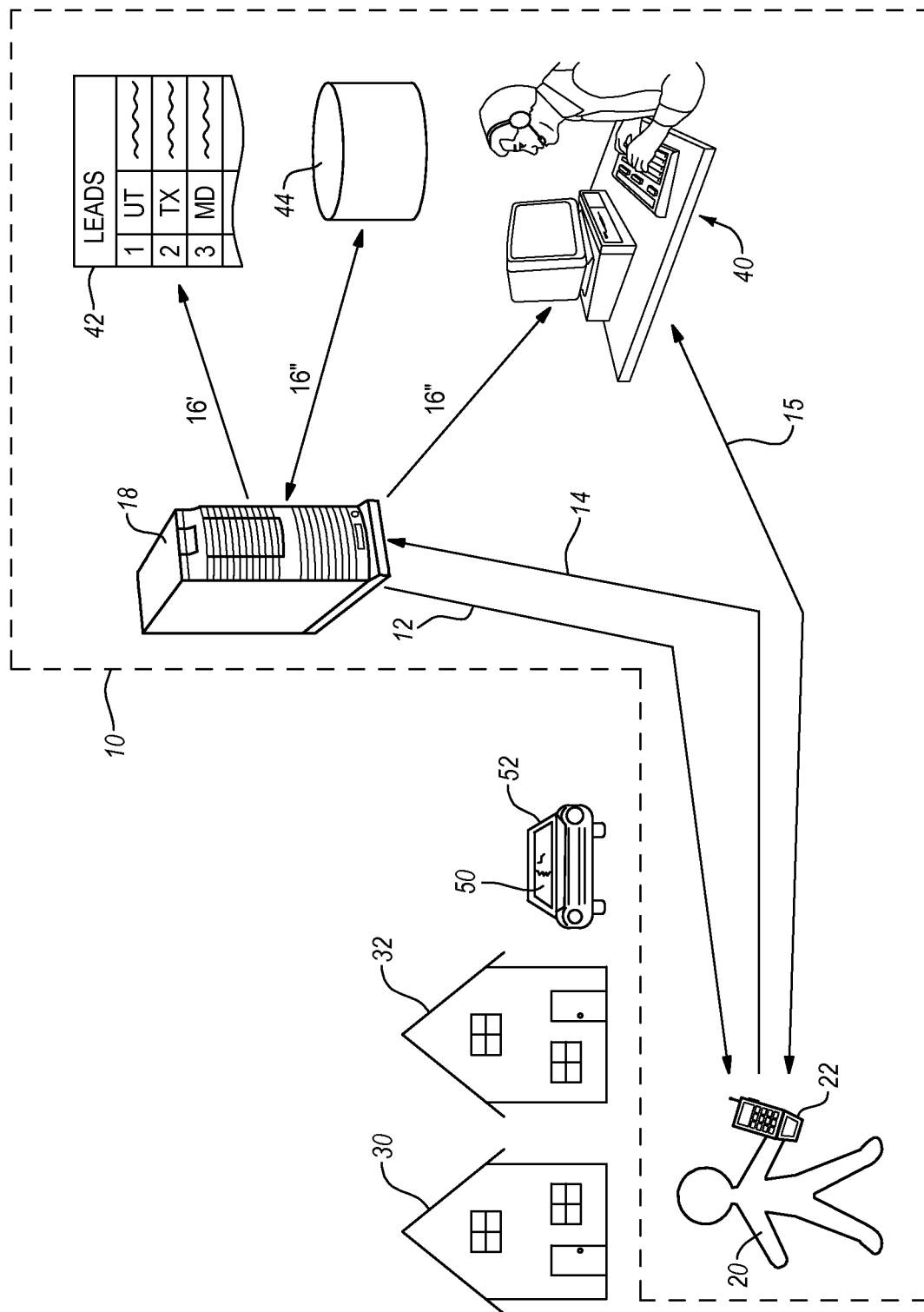
FIG. 1 shows a diagram of one embodiment of a sales management tool in use.

Turning now to FIG. 1, a diagram of the sales management tool 10 in use is shown. Central service 18 provides information (as shown by line 12) about a next sales call to salesperson 20 and surveys salesperson about homes 30 and 32 and the visit(s) (as shown by line 14). The information is routed to the appropriate storage and/or action queue (as shown by lines 16', 16" and 16'"). The new data is also marked as field verified, such that the system may track data freshness and accuracy.

In one embodiment, salesperson 20 approaches home 30 in a neighborhood. Through mobile device 22, the salesperson 20 views a map of the area which may rate houses by potential for a sale. The salesman may tap on a home on the map and thereby request information about home 30 and its expected occupants from central service 18. Central service 18 retrieves information about home 30 and its expected occupants and returns it to salesperson 20. During the visit to home 30 and the residents within, salesperson 20 may pre-qualify the residents using the information about the home 30 and its occupants retrieved earlier, receive supporting data such as other current accounts for reference, record inspection data related to ancillary products and services that may be appropriate to offer the residents of home 30, or even close the sale—all from their mobile device 22. After the visit is almost complete or complete, salesperson 20 may send the collected data to central service 18. If salesperson 20 was successful, an entity, such as call center 40, may make appropriate action, such as a communication (as shown by line 15) to follow up on the sale. If ancillary products or services were available for specific offer by salesperson 20, the results of the offers may be returned to central service 18 as well.

The inspection, while tangential to the main sales call, may have value external to the company in terms of leads, partner sales, aggregate data, or other external information need. This information may include such things as business leads 42, such as evidence of broken windshield 50 on a car 52 for a windshield repair company. The information may include demographic information stored in database 44, which may be useful to a marketing company. The information may also include antenna information such that salesperson 20 may offer a special on satellite TV on behalf of a partner based on the lack of a satellite antenna on home 30. Thus, the inspections may include information that is useful to parties that partner with the sales company or may be valuable in other ways. As salesperson 20 may benefit from the value of the data, it is in his best interest to give good information.

Salesperson's 20 mobile device 22 software may be set up such that once the request for information about home 30 has been made, the software may not continue further until a report has been filled out. The report may include an inspection report, the result of the sale, and other data observable by the salesperson. Once complete, the software may allow the next home report to be accessed and salesperson 20 may be credited with the contact and any accompanying sale. The software may also use location finding, such as a GPS, to aid in determining the next address for the report request.

The sales management tool may save a salesperson effort and time. For instance, many companies require that a potential customer be pre-qualified in the form of a credit score, such as a FICO® score by Fair Isaac Corporation. In one embodiment, the salesperson 20 may confirm the identity of the people living in the home corresponds to the data retrieved from the database and request a pre-qualification. In fact, the pre-qualification may simply require selecting a house on a map and confirming the resident's name. If the pre-qualification fails, the salesperson may quickly end the sales call and move on to the next home. If the pre-qualification passes, the salesperson 20 may place more effort into the sales call, knowing that the sale may be closed. In another embodiment, the sales person is given a list of nearby current accounts. The sales person may then use the information in their sales pitch to help reduce the customer's resistance to purchase. Thus, by reducing the amount of data input, providing more information to the salesperson 20 earlier in the sales process, the sales management tool becomes valuable to the salesperson 20.

By providing useful information and tools to the salesperson 20, the salesperson has an interest in pulling the next home report. By requiring a survey that may lead to rewards (such as a list of houses recently contacted) and allow access to his next report, the salesperson 20 will likely have an interest in filling out a correct report. Similarly, the salesperson 20 will likely put in the correct information because he depends on the same database information to make his sales calls and to receive credit for visits. As result of the self-interest of the salesperson 20, the data sent by the salesperson is fresh and observed and will be marked as field verified.

Once the sales call data is stored in central service 18, the data may be routed to areas based on its use. Successful sales data may be routed to call center 40, where the salesperson 20 or resident of the home will make preparations to finalize the sale if more action is required. Potential leads 42 may be sorted and sent to appropriate partners or aggregated for later use.

Figure 2:
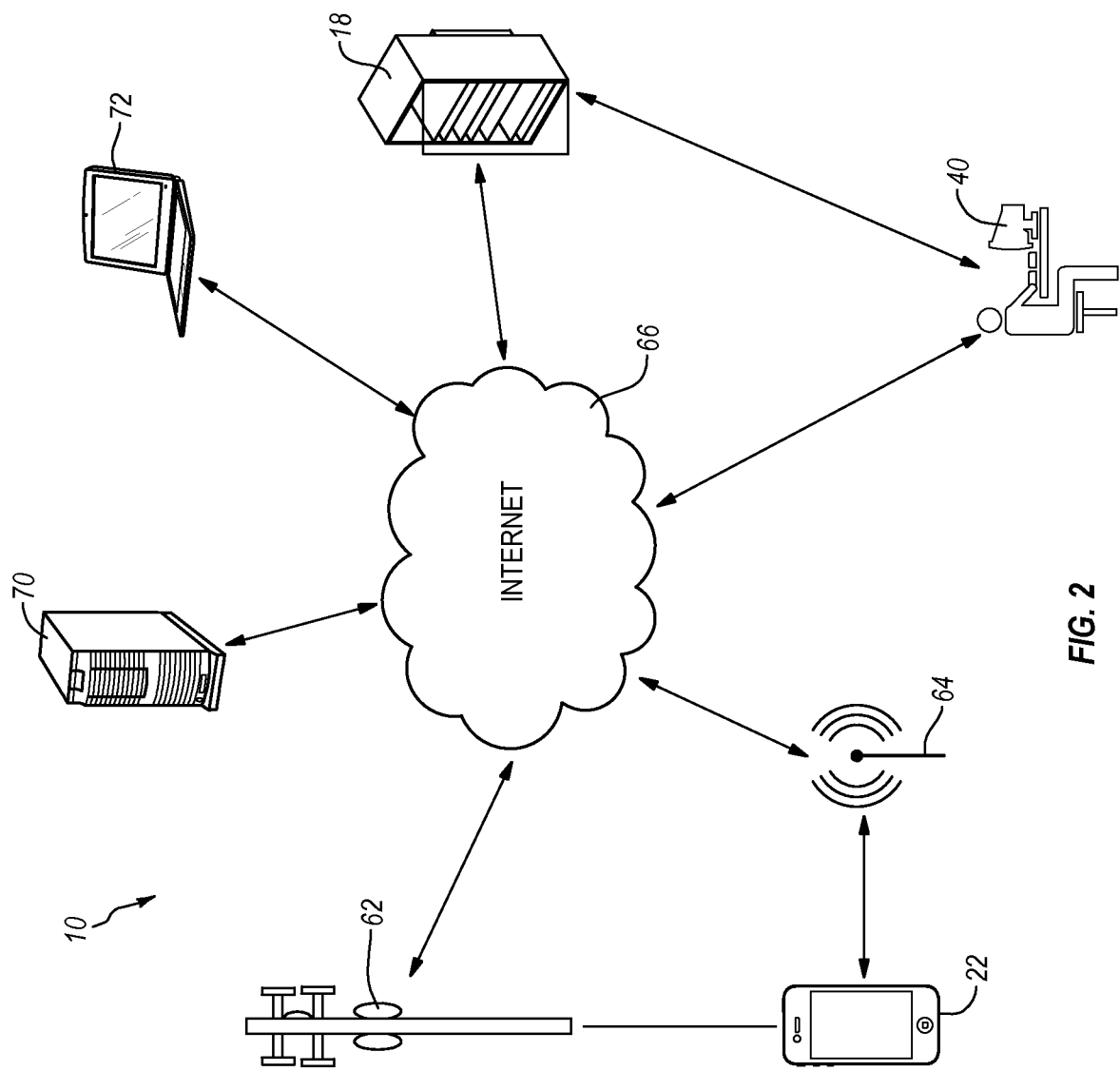
FIG. 2 shows a communication diagram of one embodiment of a sales management tool in use.

Turning now to FIG. 2, a communication diagram of sales management tool 10 is shown. Mobile device 22 communicates with cell tower 62 or other wireless access point 64 to access the Internet 66. The communication may then be routed to central service 18. In a similar way, central service 18 may communicate back to mobile device 22.

Central service 18 and mobile device 22 may also communicate with other systems to store and utilize the sales data. Call center 40 may monitor central service 18, receive messages about successful sales and organize call-backs to finalize the sale. Referral and lead generation data may be sent to other business servers 70 for their use. Management system 72 may monitor these transactions, system status of the various devices, status of the salespeople and run reports based on data stored in the central service 18.

Figure 3:
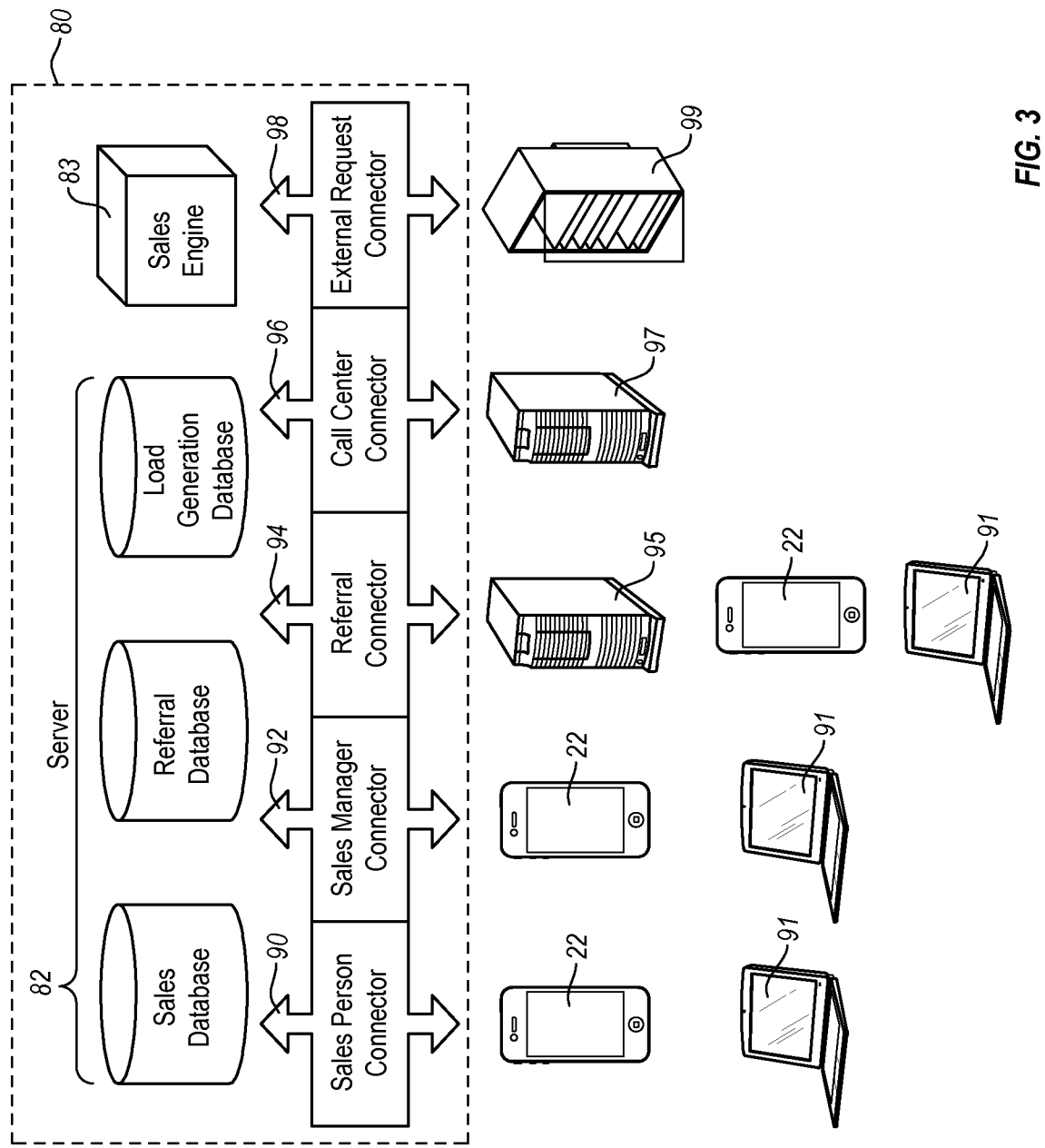
FIG. 3 shows a functional diagram of external connectors between a database server and external services.

Turning now to FIG. 3, a functional diagram of external connectors between database server 80 and external services is shown. In one embodiment, database server 80 may include business logic that ties data requests and data reports to databases 82 and a sales engine 83. As the data need and protocols of the communication differs according to the purpose of the communication, the business logic connector may be tailored to each application.

Sales engine 83 may include logic to aid the success of salespeople and sales management. In one embodiment, the sales engine 83 may perform predictive analysis. The predictive analysis may process information in the databases 82 to discover commonalities between successful sales and unsuccessful sales. The system may identify specific characteristics, such as a section of a street that is more receptive to the sales than other customers (perhaps because the neighbors have discussed security). These potential sales may then be flagged and stored for salespeople in the area, including the commonality identified by the engine.

In other embodiments, the sales engine 83 may include external data sources in its decision making process. For instance, the sales engine may be connected to a data warehouse 85 (not shown) and perform a trending analysis over time. The trending analysis may show which neighborhoods are increasing security awareness and which neighborhoods are decreasing awareness, along with an expected date of best sales. In other embodiments, the sales engine may retrieve and digest public or private data. In one embodiment the sales engine uses public safety information, such as recent crime reports. Neighborhoods and streets may be targeted that have recently felt the effects of crime.

In other embodiments, the sales engine 83 may aid the sales manager in achieving higher sales. The sales engine 83 may match sales people with neighborhoods. In one embodiment, the sales engine may use past sales person successes and compare it with neighborhood socioeconomic factors. The engine may then suggest placement of the sales person with neighborhoods that appear the most comfortable and successful for that sales person, i.e. a member of a particular ethnicity in a neighborhood with a high concentration of that ethnicity, or a female in neighborhoods having demographics where female sales personnel have outsold their male counterparts.

In another aspect of the invention, the sales engine 83 may suggest neighborhoods based on past number of people home on that day of the week (or warn a sales manager of potential for no one to be home). For instance, the sales engine 83 may warn that an Irish neighborhood may not have the most effective sales on St. Patrick's Day based on past sales history.

While the sales engine 83 has been discussed as one object, it should be noted that the sales engine may be split into multiple, specific purpose engines.

As Sales person connector 90 has a purpose to connect the database requests and reports from salespeople to the databases and flag the results as field verified. These requests and reports may be from devices that include mobile devices 22, computers, laptops 91 and other portable devices that are accessible to salespeople in the field. Further details may be seen in FIGS. 4 and 5 and their corresponding descriptions.

Sales manager connector 92 has a purpose to allow a sales manager to manage her sales force. The requests and reports are likely to be from similar machines as the sales force. Further details may be seen in FIG. 6 and its corresponding description.

Referral connector 94 has a purpose to contact partners with sales and sales opportunities. This may be in the form of direct database server 80 to partner server 95 communication, emails, text messages, or an aggregation of information which is then transmitted to the partner. Immediate communication may be more appropriate when a salesperson has convinced the resident of the home to purchase a partner's product or services. Less immediate communication may be more appropriate when the information is more related to leads or demographics. Thus, the referral connector 94 may include logic to determine the immediacy of dispatching field verified data to partners.

Call center connector 96 has a purpose to route field verified data to a call center shortly after being sent by a salesperson. In one embodiment, a salesperson will make the sale to the resident of the home and then send the relevant data to the sales person connector 90. As the new data becomes available, the data may be routed through the call center connector to the call center servers 97. The new customer or salesperson may then be called if further action is required. As the call center already has the data from the salesperson, the call may be completed more efficiently and quickly.

External request connector 99 has a purpose of retrieving and loading external data into the database server. In one embodiment, a salesperson requests information about residents of a house. If the data is not currently in the database, database server 80 may contact external data vendor 99 through external request connector 98 to populate the database with relevant information. The database server 80 may then send the information back to the salesperson through sales person connector 90. Similarly, the external request connector may request pre-qualification from the credit bureaus, using information about the confirmed residents of a home. The resident's data may have been previously retrieved based on the address of a house selected by the salesperson.

While server 80 has been shown to be a single machine, it should be recognized that components of the software may run on separate machines or in a cluster or cloud setup. In one embodiment, the databases are hosted on a server that is separated from the connectors, such that the connector server serves as an intermediary between the database host and outside communications.

Figure 4:
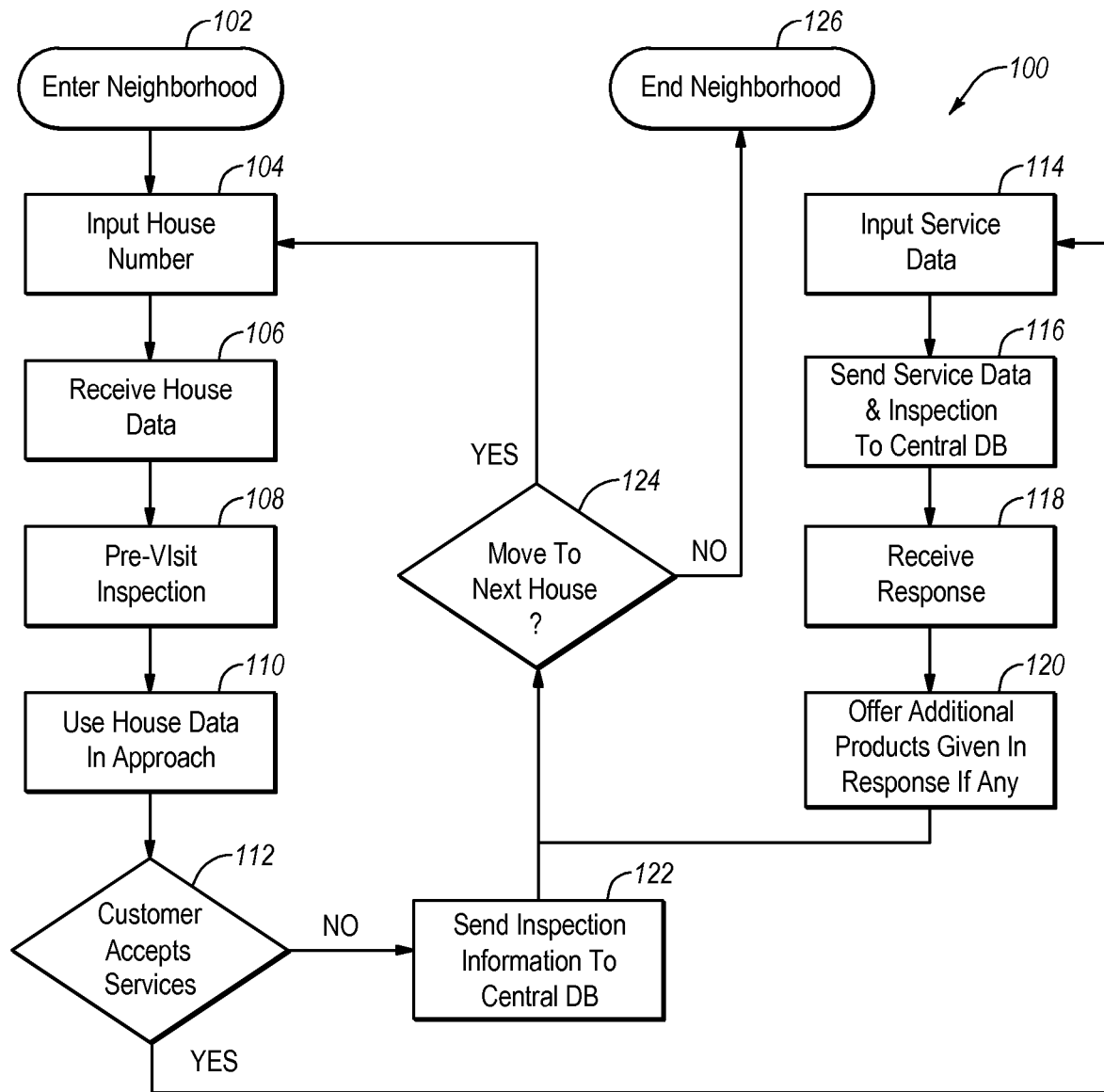
FIG. 4 shows a flowchart of a sales process using a sales management tool.

Turning now to FIG. 4, a sales process 100 using the sales management tool 10 is shown. In one embodiment, the salesperson enters neighborhood 102 at the beginning of her route. She inputs the first house number 104 and street and sends the input to the central service. The salesperson then receives house data 106 from the central service. The salesperson's device may then switch to a survey mode in which pre-visit inspection data may be entered 108. After having reviewed the house data, the salesperson may now custom tailor the sales approach using house data 110. The salesperson will then decide whether to continue the sale based on if the customer accepts the services or product 112. Part of that accepting services or product may include a pre-qualification.

If the customer accepts the sale, the salesperson proceeds with finalizing the sale. The salesperson may input more service data 114, and verify current information. This information may include payment information, contract information, special offers/discounts, and other information that may be required, helpful or tangential to the sale or partners. The service data and inspection data may then be forwarded to the central service 116, which may process any payments required or schedule any appointments. Based on the response received 118, the salesperson may follow up with any additional product or service offers received in the response 120. The salesperson may then choose whether to move to the next house 124 and input a house number 104 or end her sales process in the neighborhood 126.

Otherwise, if the customer does not accept the sale, the salesperson will send the inspection data and result of the sales call to the central database 122. The salesperson may then choose to move to the next house 124 and input the house number 104 or end her sales process in the neighborhood 126.

This embodiment has the advantage of sending field verified data to the central service 116. The data may be trusted because it was input when freshly in the mind of the sales person. The sales person has an incentive to provide the fresh data because she knows that her manager may monitor the times between submitting the data (avoiding fraudulently created paper reports done well after the alleged sales attempt). She is further incentivized because any leads generated by her report may earn her money.

Figure 5:
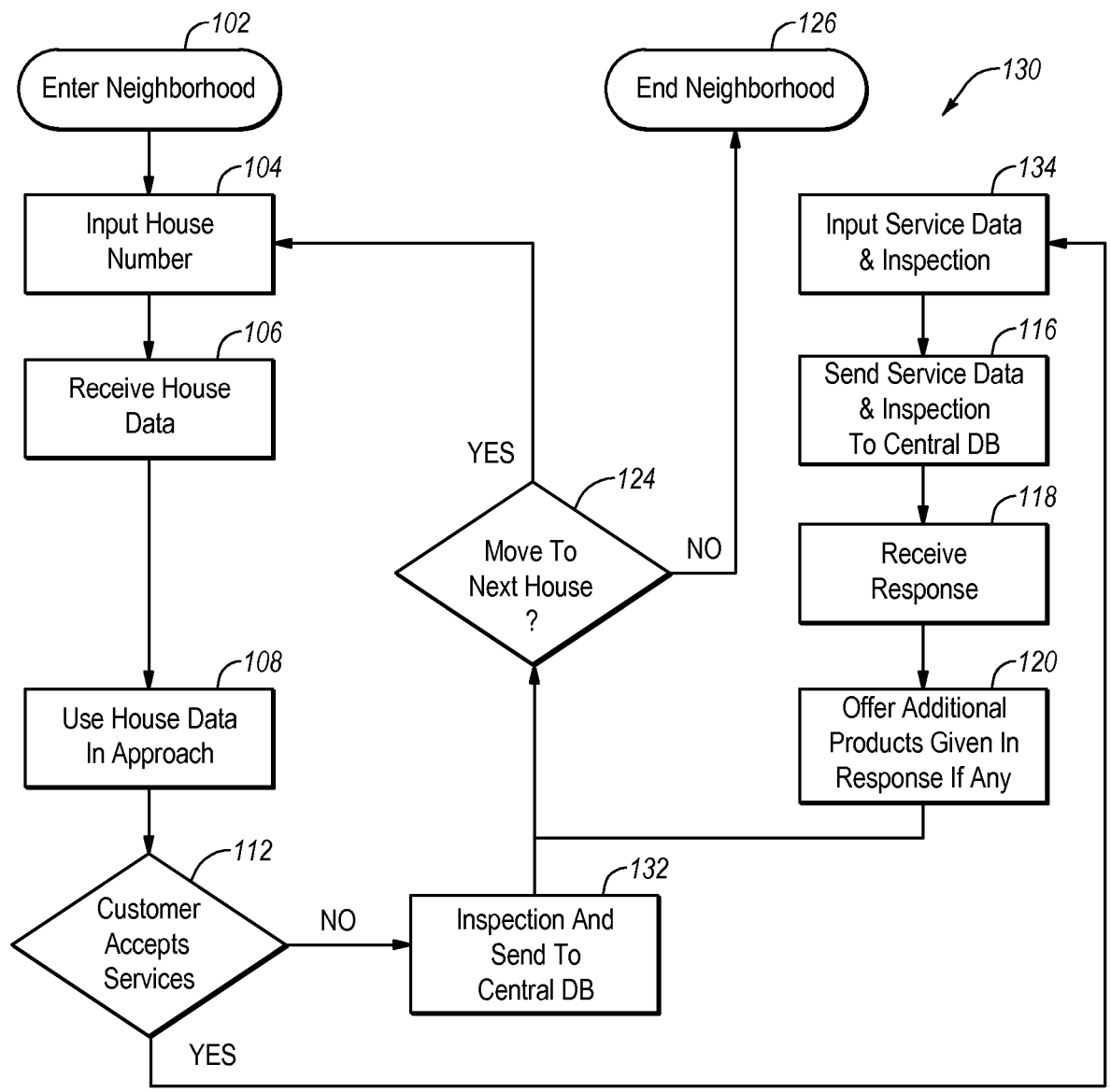
FIG. 5 shows a flowchart of another embodiment of a sales process using a sales management tool.

Turning now to FIG. 5, an alternate embodiment of a sales process 130 is shown. It will be appreciated that some steps may be accomplished in a different order or in parallel. In such embodiments, an inspection may occur after the customer has decided to accept or reject the offered services in 132 or 134.

Figure 6:
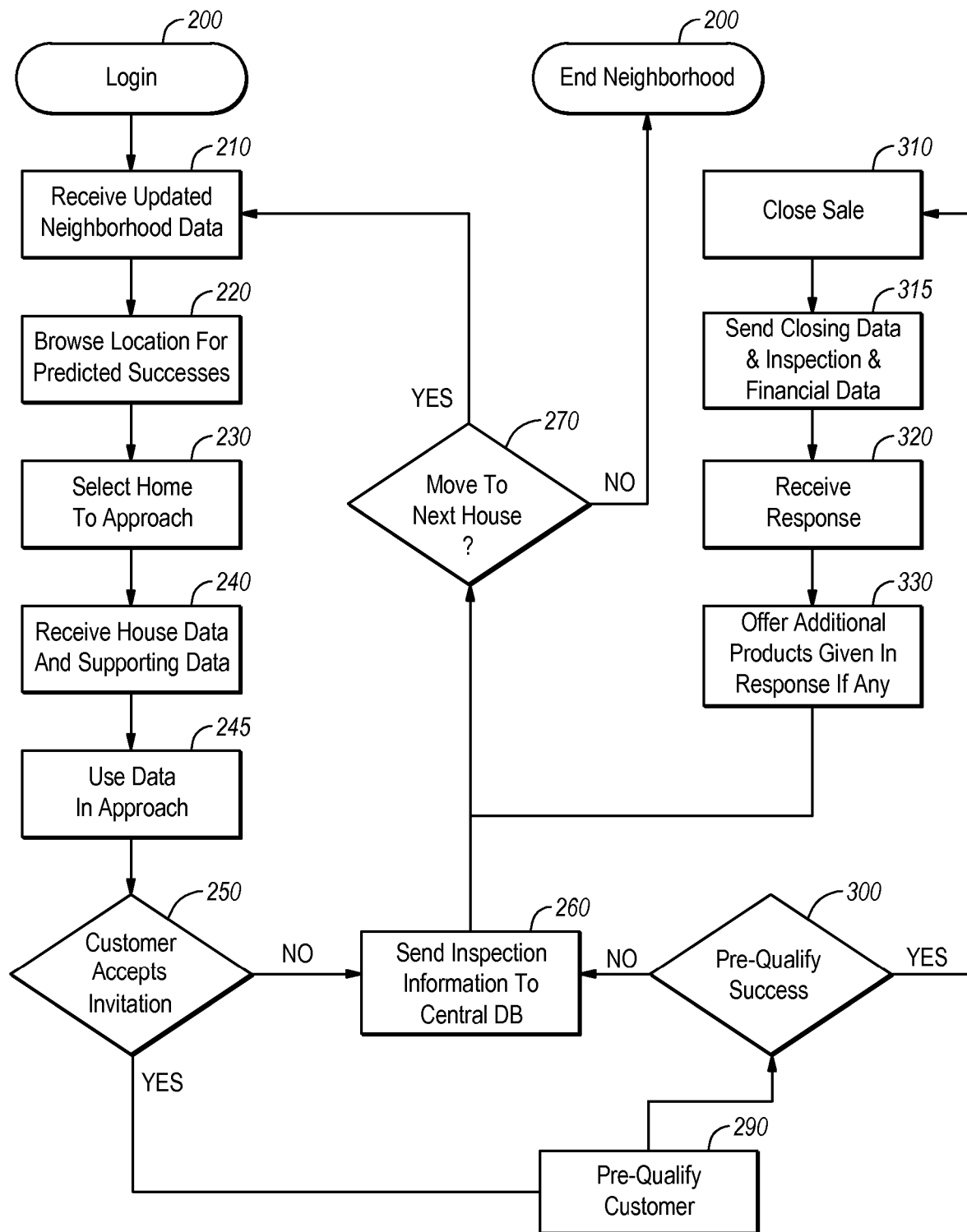
FIG. 6 shows a flowchart of third embodiment of a sales process using a sales management tool.

Turning now to FIG. 6, a flowchart of third embodiment of a sales process using a sales management tool is shown.

The user may begin by choosing to login 200. Once logged in, the mobile device may give a current geolocation to the server and receive updated neighborhood data about the surrounding area 210. The user may examine the neighborhood data displayed and look for highlighted predicted successes 220. The user may then tap on the home on the map displayed on the mobile device to select the home for approach 230. A server request may be generated for the information relating to the home selected. The mobile device may receive the house data and supporting data 240 to aid the salesperson in their approach 245. The customer may then indicate a level of interest in the product by whether they accept an invitation 250 to continue with the sales process.

If the customer chooses to not continue with the sales process, the gathered information is sent to a central database 260. This gathered information may include the reasons for rejection (i.e. price is too high, potential customer already owns the product, potential customer does not use the product, etc.), a site survey of the house (including observed products), or other information requested through the mobile device interface. The sales person may then choose to move to a next house 270. If so, the process may begin again at receiving updated neighborhood data 210. If not, the sales person may exit the process 280.

If the customer shows an interest in the sale, the salesperson may use the home data requested earlier to pre-qualify the customer 290. If the pre-qualifying 300 fails, the salesperson may end the sales call and the data may be automatically uploaded by the mobile device in the case of a failure (or it may be manual, with an opportunity to give more information in a site survey) and the inspection information sent to the central database 260.

If the pre-qualification is successful, the sales person may tailor the sale to the customer to close the sale 310 and send relevant data, such as closing data, inspection data and financial data 315. In one embodiment, the system may be used in a security system sales context. The sales person may conduct a site survey and suggest various technologies to install, such as motion detectors, keypads, flood sensors and other useful add-ons. After the customer and sales person agree, the closing may include a deposit put on a credit card. The closing data, inspection and financial data may be sent to the system server for processing. The mobile device may then receive a response 320, such as a confirmation or request for further information if needed. If there are other suggested products or partnerships, the mobile device may present the offers for the salesperson to offer to the customer 330. The salesperson may then decide whether to move to the next house 270.

While many transmissions have been discussed by the use of a mobile device, it should be recognized that the transmissions may be made on or with various channels, mediums and/or protocols. The transmissions may be encrypted, wired or wireless, internet based, satellite based, authenticated, through public or private networks, using TCP/IP, UDP or OS1 or through other methods of communication.

Figure 7:
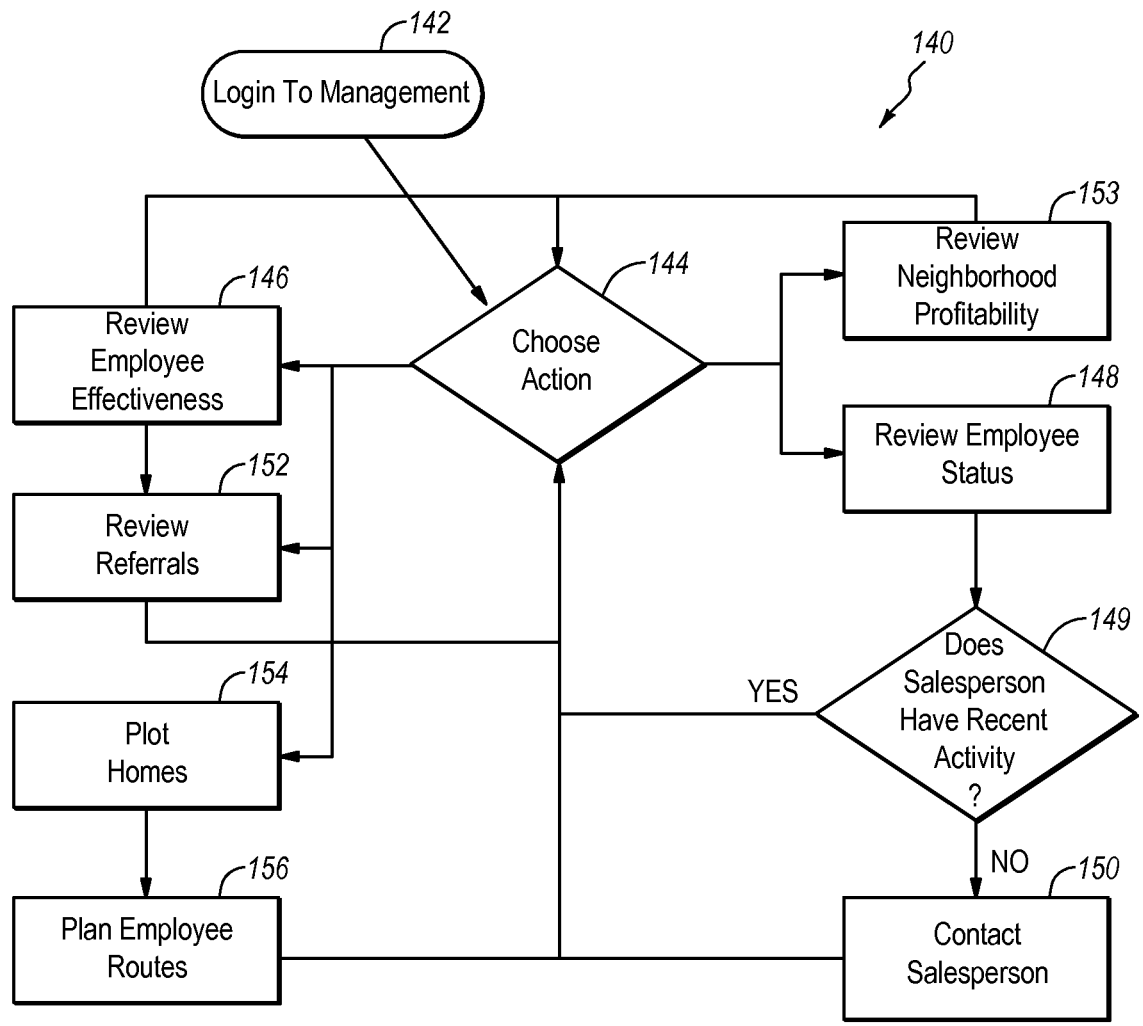
FIG. 7 shows a flowchart of an embodiment of a management subsystem.

Turning now to FIG. 7, a flowchart of an embodiment of the management subsystem 140 is shown. The management subsystem may include portions to manage employees, profitability, and resources. The manger may login to the management subsystem 142 and then select a desired action 144. One of the distinct advantages of this system may be that the information within the database has, been field verified by salespeople with an interest in correct information. Subtrends, such as people home/not home, are distinctly more trustworthy from a salesperson marking the data immediately at the home than from a salesperson marking at the end of the street—or worse—at the end of the day, or some longer period.

The management subsystem may include actions to manage employees. In one embodiment, the manager may select to review the employee current employee status 148. As the central service will know the times the salesperson requested house data, the manager may review data that includes the current status of the employee, the number of houses visited, the success rate and even when the last house data was requested. The data may show recent activity 149 or discrepancies signaling a problem, including as a salesperson has not recently requested house data. While in safer neighborhoods, this extended time may be evidence of a salesperson on an extended break, in more dangerous neighborhoods it may alert the sales manager to a potentially dangerous situation. Therefore the sales manager may contact the salesperson 150 and resolve any problems encountered.

In one embodiment, the manager may select an employee effectiveness report 146. The report may use field verified data from the central service to give a more accurate picture of performance than profitability alone. For instance, if a salesperson's results status is showing many residents that were home but did not accept the services or product offering, sales training and help may be in order. However, if a salesperson was sent to a neighborhood with few people home, the salesperson may simply need a better territory. Similarly, more granular results may be useful as well. If the salesperson shows a lot of people home and a significant time between retrieving the house data and sending the failed sales result and inspection data, the salesperson may need training in closing the sales deal—as the sales person's approach is likely ineffective.

The profitability of the territory, neighborhood and sales people may be reviewed. In one embodiment, the manager selects to review neighborhood profitability. Significant sales within a neighborhood as evidenced against the number of people home may suggest a profitable trend to exploit. For instance, recent events, such as burglaries or other crimes within a neighborhood may cause more people to be willing to purchase a security system or insurance. However, if the neighborhood contains many working couples, that trend may go unnoticed. Therefore field verified data may be very useful to spot these trends. Normal sales data with sales per neighborhood may miss such a valuable insight available with field verified data.

One of the valuable insights may come from the manager selecting to review the referrals 152. In one embodiment, the manager can review the referrals generated and their profitability. The manager may then inform the sales people of the opportunity presented by the verified data and the corresponding returns. As the sales people are likely to make more money with the sales opportunity, the sales force may be happier as well.

In another embodiment, the manager may manage the data stored in the referral database. The manager may collect a list of residents that have a specific need based on the verified data. Once the data reaches a critical mass, it may be sold or given to a partner in exchange for value.

Another valuable insight that comes with the field verified data is that a plot of unvisited homes 154 may be very accurate. Further, the field verified data may include attempted times and dates of sales visits. With this data, the system may create an estimate of the number of people home at a selected time on a selected day. The model may also include a recency factor, to revisit homes after a certain delay. Homes may also be included that requested that a salesperson visit another time, or after a delay, which may be frequently overlooked with paper data tracking methods.

By leveraging this data, the software in conjunction with the manager may plot neighborhood routes 156. Using the verified data, these routes may be adjusted based on predicted profitability, number of houses to visit, estimated difficulty of sale or other metric that may be derived from the verified data and other data available.

Many of the actions and reports may also be configured to give live updates to the sales manager or other person with a need for the information. Such immediate information may be communicated in email, text messages or other forms of communication. In one embodiment, a text message will be generated if the employee does not request house data within a certain period of time. This also may be adjusted according to the last request received by the central service. A salesperson that has finished an inspection, but has not request new house data, may have a shorter timeout than a salesperson who has requested the house data and is likely in a sales situation.

While a more generic embodiment is shown in FIG. 7, it should be realized that there may be several layers to the management subsystem. In another embodiment, the management subsystem may be split into a sales manager management subsystem, a referral management subsystem, and an overall management subsystem. The sales manager subsystem may give report and route information to the sales manager for her area, but restrict the sales manager from partner and profitability statistics. The referral management subsystem may restrict the referral manager from route and salesperson information, but give access to partner data and statistics. The overall management system may give all access, but also include reports about each individual sales manager and assess profitability of each of the partnerships and/or offers.

Figure 8:
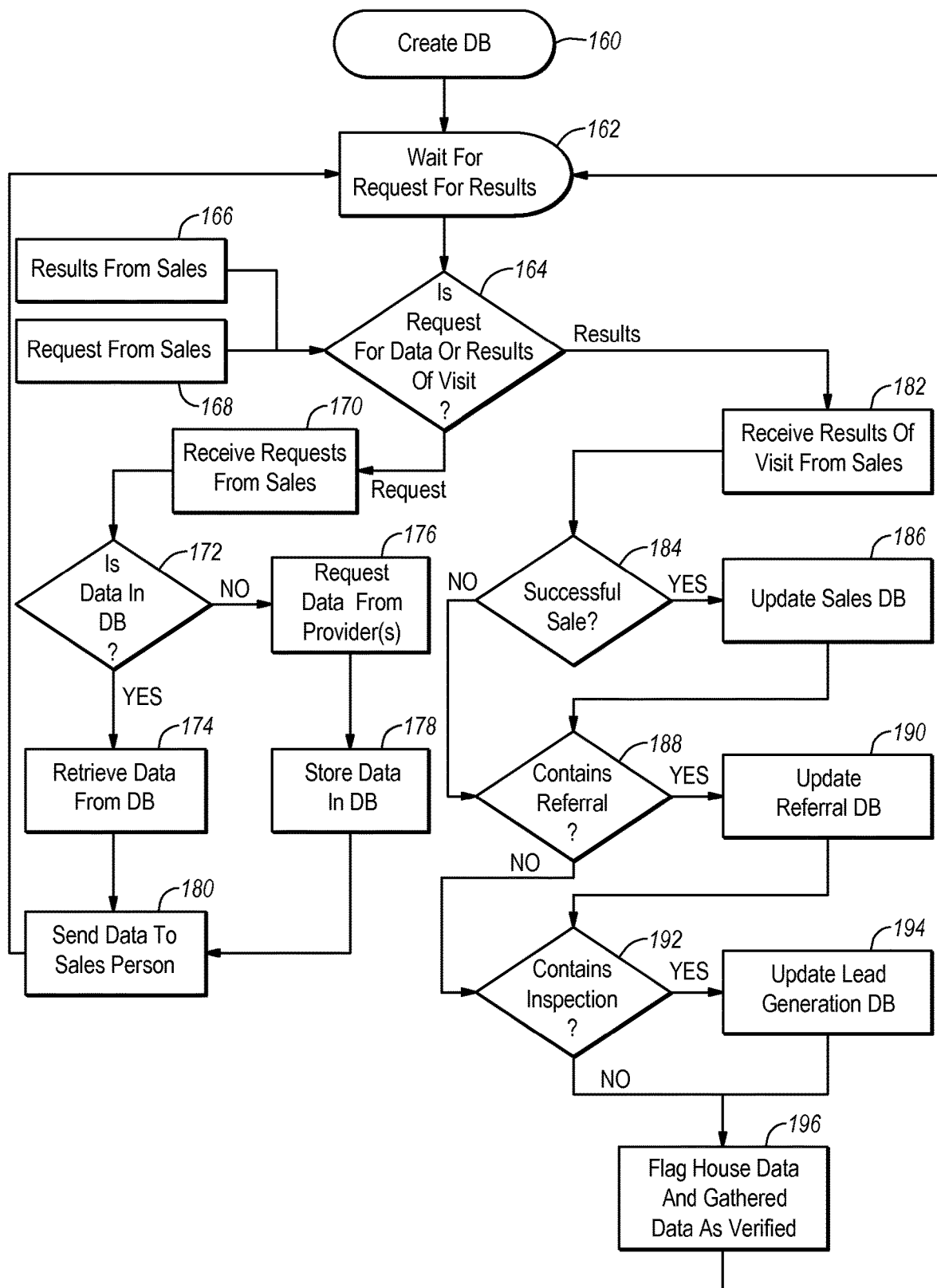
FIG. 8 shows a flowchart of a database enrichment subsystem.

Turning now to FIG. 8, a flowchart of the database enrichment subsystem is shown. In one embodiment, the system has at least two purposes: to deliver data to sales people for better sales approaches and to enrich the database with field verified data. As any data retrieved is likely to be enriched by a response, the more the database is used, the more valuable it becomes.

In one embodiment, the process begins with the database(s) being created 160. After creation, the system may wait for requests or results from sales people 162. When a message is received in 164, the message must be identified as results from sales 166 or a request from sales 168. Once identified, the system may begin to process the message appropriately.

In the case of a request from sales 168, the sales person would like to query the database about a residence. The system may receive the request from sales 170, parse the message and store appropriate data. If the requested data is in the database 172, the system may simply retrieve the data from the database 174. If not, then the system may request the data from an external provider 176 or even multiple providers. This new data is then stored in the database 178. After the data is retrieved by either method, the data is sent to the salesperson 180 and the system waits for another request 162.

In the case of results from sales 166, the salesperson may be returning data related to the house data requested earlier. The system may receive the results from sales 182, parse the message and store appropriate data. In one embodiment, this includes if there was a successful sale 184, updating the sales database 186 with that information. Then if the message contains a referral 188, updating the referral database 190. And if the message contains an inspection 192, then updating the lead generation database 194. Finally, any field data gathered is flagged as verified 196.

Data about the request or results message may be stored as well. In one embodiment, the time difference between the request for information about a house and the results may correlate with the effectiveness of a salesperson. Similarly, storing times and dates of residents found at home may correlate with the best times to visit the neighborhood. Thus, effective field verified data may include more than just sales and referrals.

While some events in the description of figures may seem to be sequential or tailored to a single request, it should be recognized that both the processing of a request step and the processing of multiple requests may be done in parallel. For instance in FIG. 8, data may be simultaneously requested from an external provider in 176, while results from the database may be retrieved in 174. The results may be compared and differences flagged.

In FIGS. 9 to 32, an exemplary embodiment is shown through the use of screenshots and a description of the process. It should be recognized that the process may implemented in other ways and not limited to the embodiment described. For instance, the specific embodiment of the mobile device shown is an iPhone by Apple with an application called DataReef.

Figure 9:
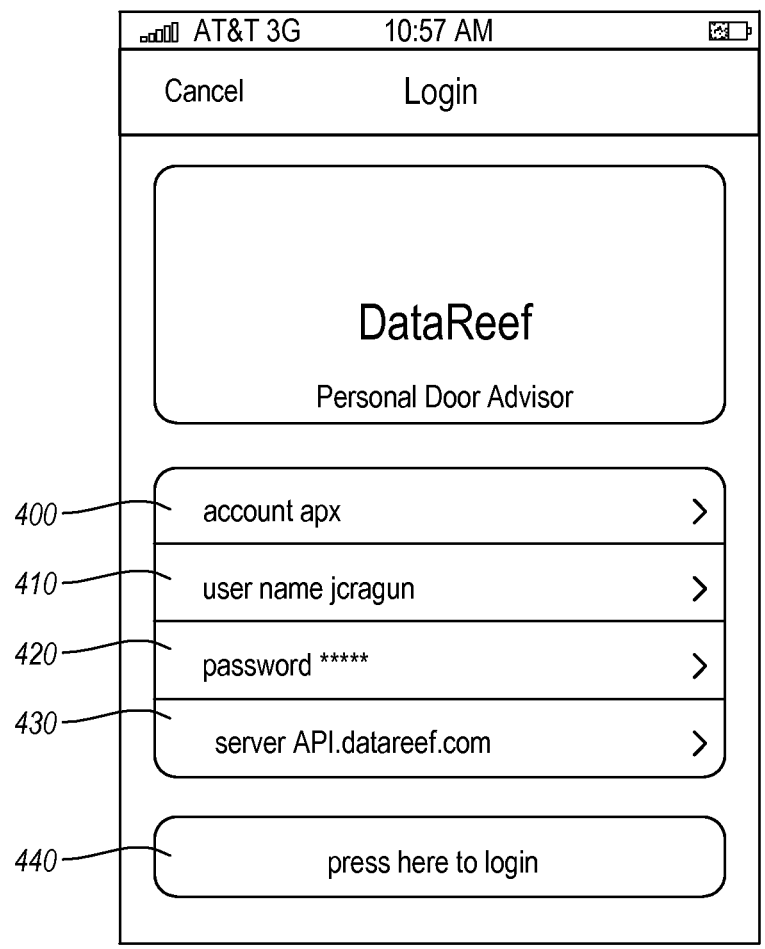
FIG. 9 shows a screenshot of a login screen of a sales management tool.

Upon arriving in a neighborhood, a user may activate the system on their mobile device. In FIG. 9, the user activates the application and logs in. More specifically, the user may enter the account owner 400, user name 410, password 420 and server name 430 to log in 440.

Figure 10:
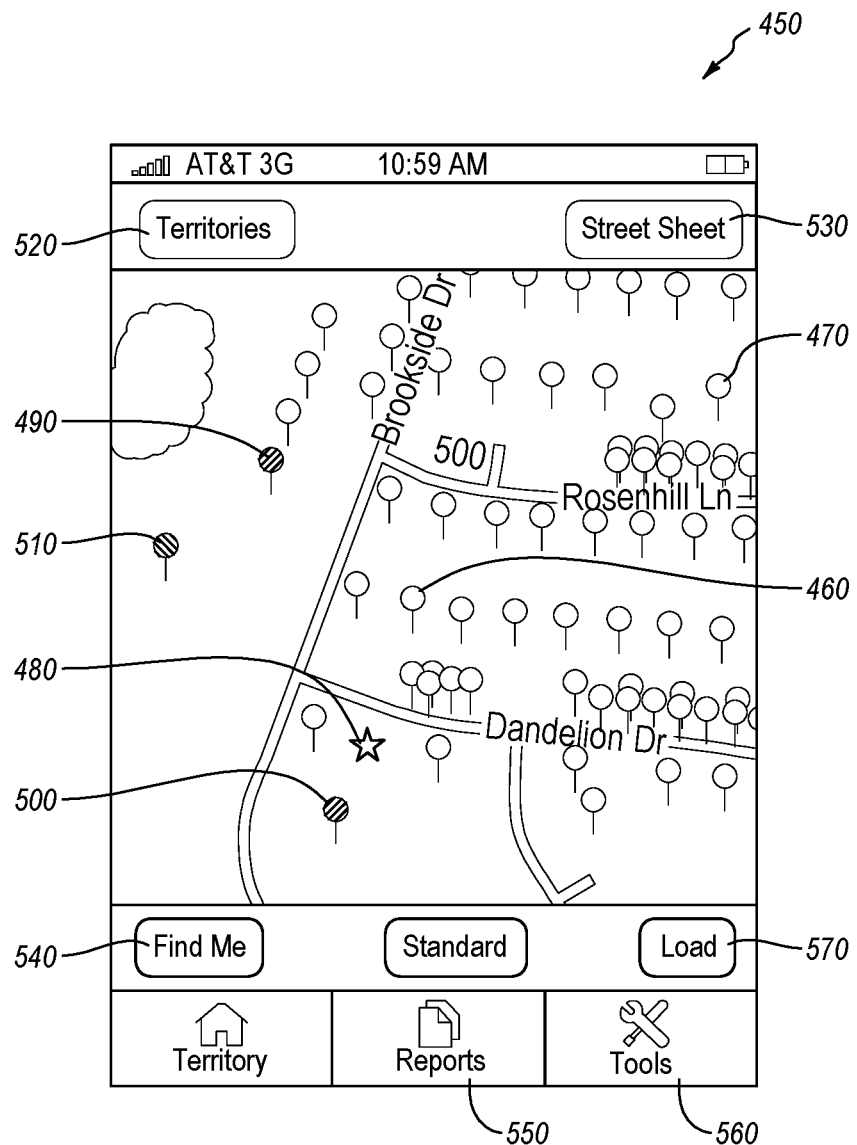
FIG. 10 shows a screenshot of a map screen of a sales management tool.

Once successfully logged in, the user may be presented with neighborhood screen 450 as shown in FIG. 10. Using a location device, such as GPS, the mobile device may identify and display the current location 460 of the sales person on a map. The map may also identify individual homes, such as by a push-pin 470. Homes with special relevance may be highlighted. Here, the homes identified by the sales engine through predictive analysis as high potential are highlighted with a star 480. Prior sales are identified by a green highlight 490. Homes registered by a prior sales call as "not interested" are highlighted red 500. Prior sales calls that registered the home as "not home" may be gray 510. Other potential information may also be highlighted, such as current accounts, potential danger, or other information, including those related to safety, profitability, past history or difficulty of sale. The salesperson may also choose to access other portions of the tool, such as a territories report 520, the street sheet layout 530, refocus on the current location 540, switch to reporting 550, select other options 560 or request a refresh of the current information 570.

Figure 11:
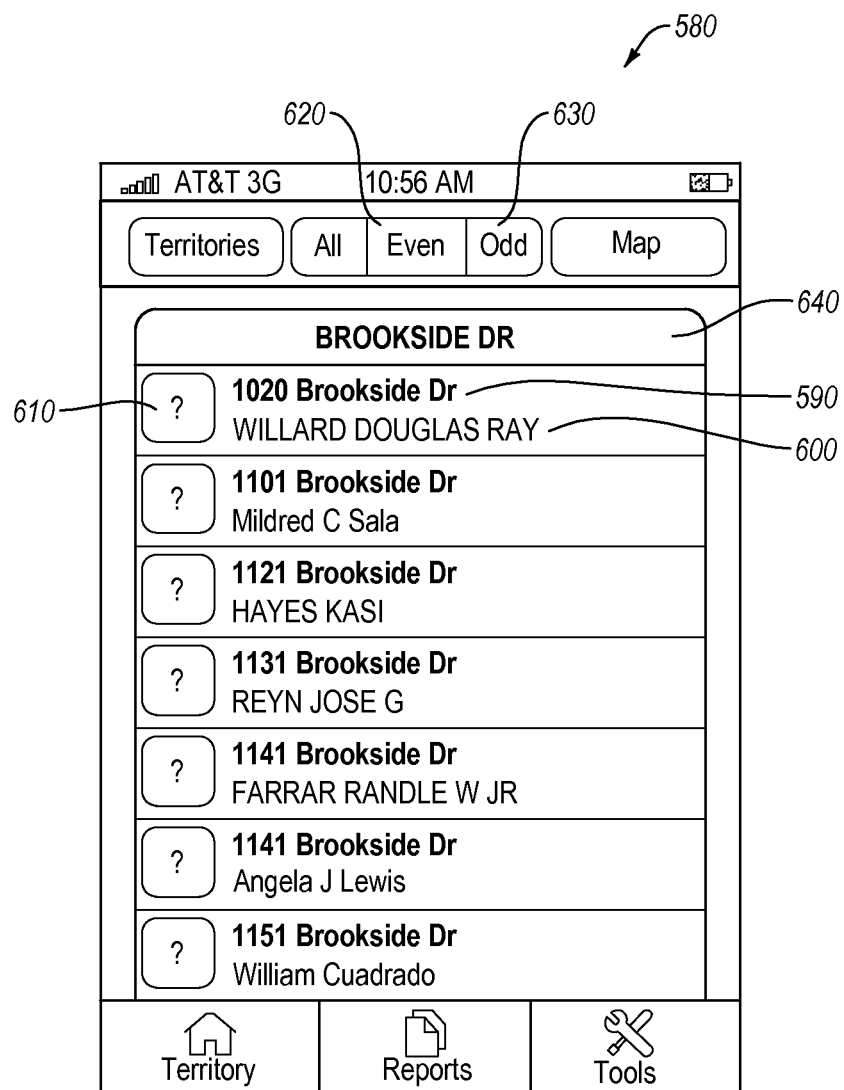
FIG. 11 shows a screenshot of a street sheet screen of a sales management tool.

If the salesperson desires, the salesperson may choose to view the list of homes on a street sheet 580, such as in FIG. 11. The street sheet may include house addresses 590 associated with homeowner names 600 retrieved from public or private databases. Each home database entry may be further enriched with data from the sales system, such as an icon 610 indicating the last status of contact. In the current screenshot, there was no last status of contact for the homes listed. The street sheet may include further features for ease of use. A salesperson may limit the listings to even 620 or odd 630 house numbers, because the sales person may only want to walk on one side of the street. The home listings may also be grouped by street 640. The tool may also provide methods to link to other portions of the tool as more fully described above.

In some embodiments, the sales person is only allowed to view the homes within their assigned territory. Thus, homes not within the sales person's territory may be hidden from view, including the street sheet and the map view. A sales manager may control this feature from their sales management interface.

Figure 12:
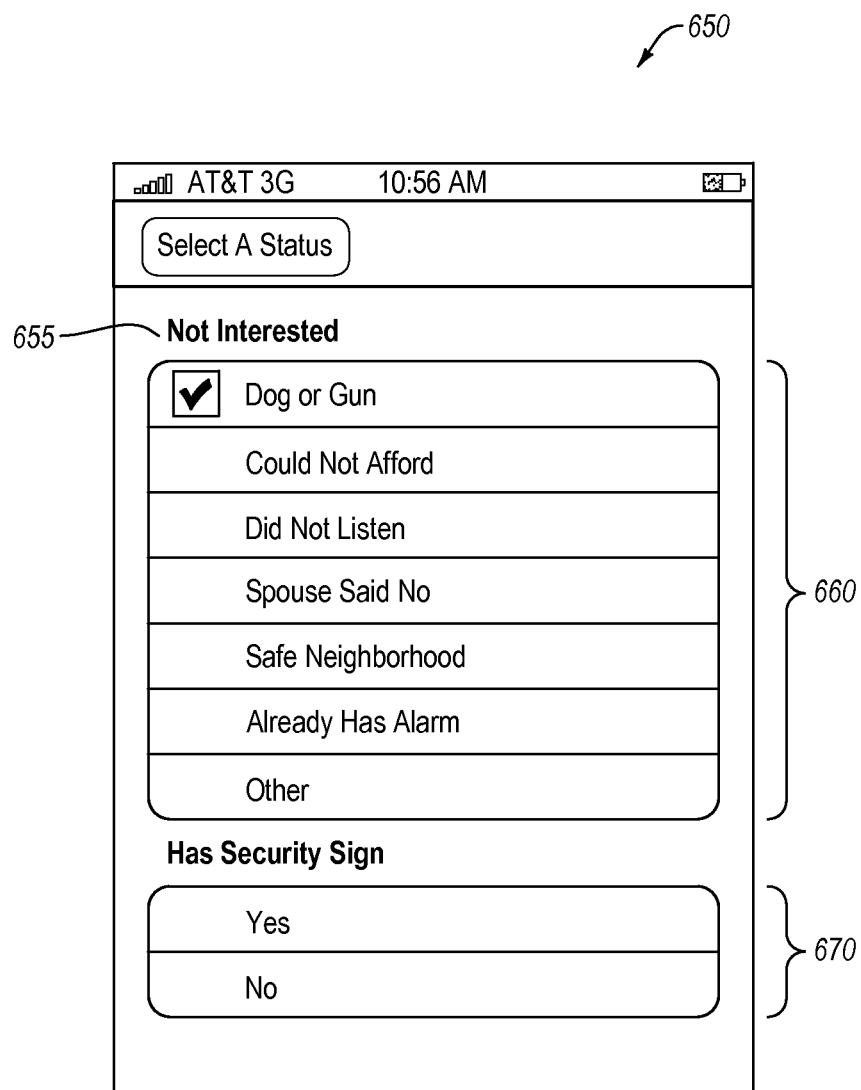
FIG. 12 shows a screenshot of a rejection screen of a sales management tool.

If the sales person approaches a home and the sales call results in a person not interested, the salesperson may mark the home as not interested along with a reason code. FIG. 12 shows a screenshot of an outcome coding screen 650 that shows the current outcome 655 and includes a reason code 660 and a relevant survey 670. In this case, the salesperson is surveyed on whether the home displays a security sign.

Figure 13:
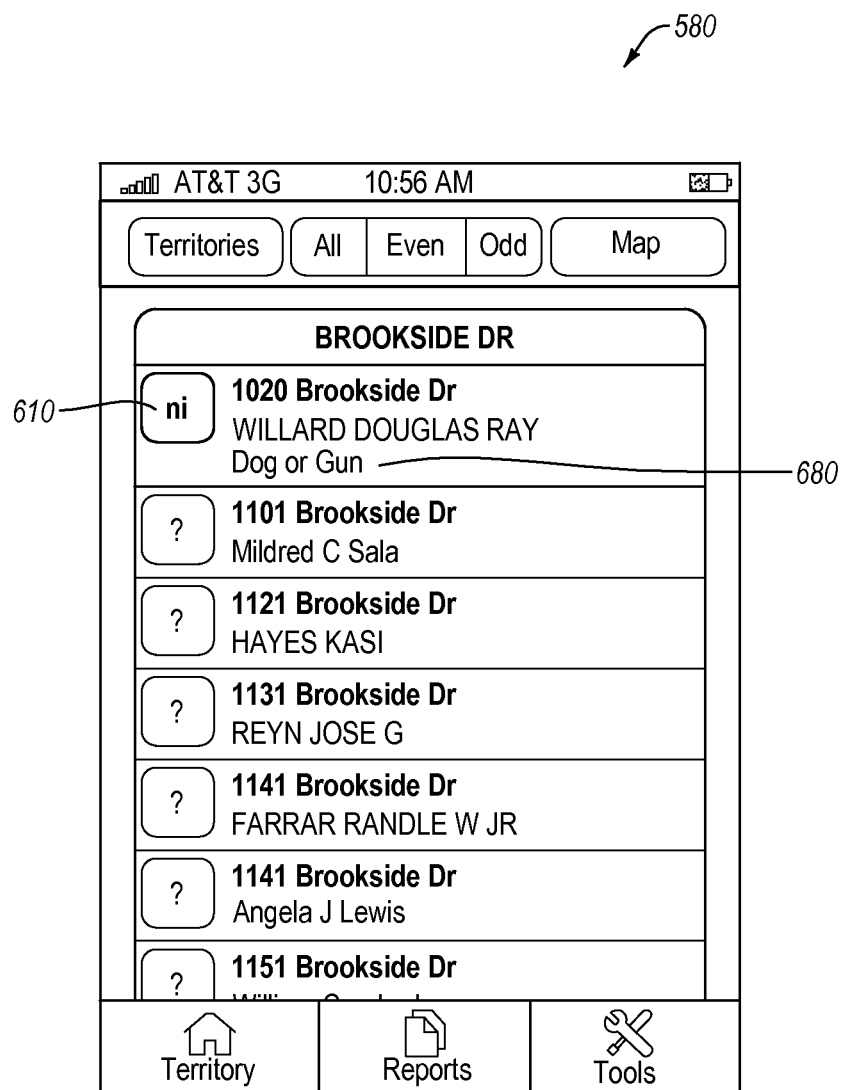
FIG. 13 shows a screenshot of a street sheet screen with a contact result of a sales management tool.

The system may then return to the neighborhood listings, such as the street sheet shown in FIG. 13. The home status icon 610 may be updated to display the current states of the neighborhood homes. Here, the top address was updated to not interested with a reason 680 of the fact the owner had a dog or gun.

Figure 14:
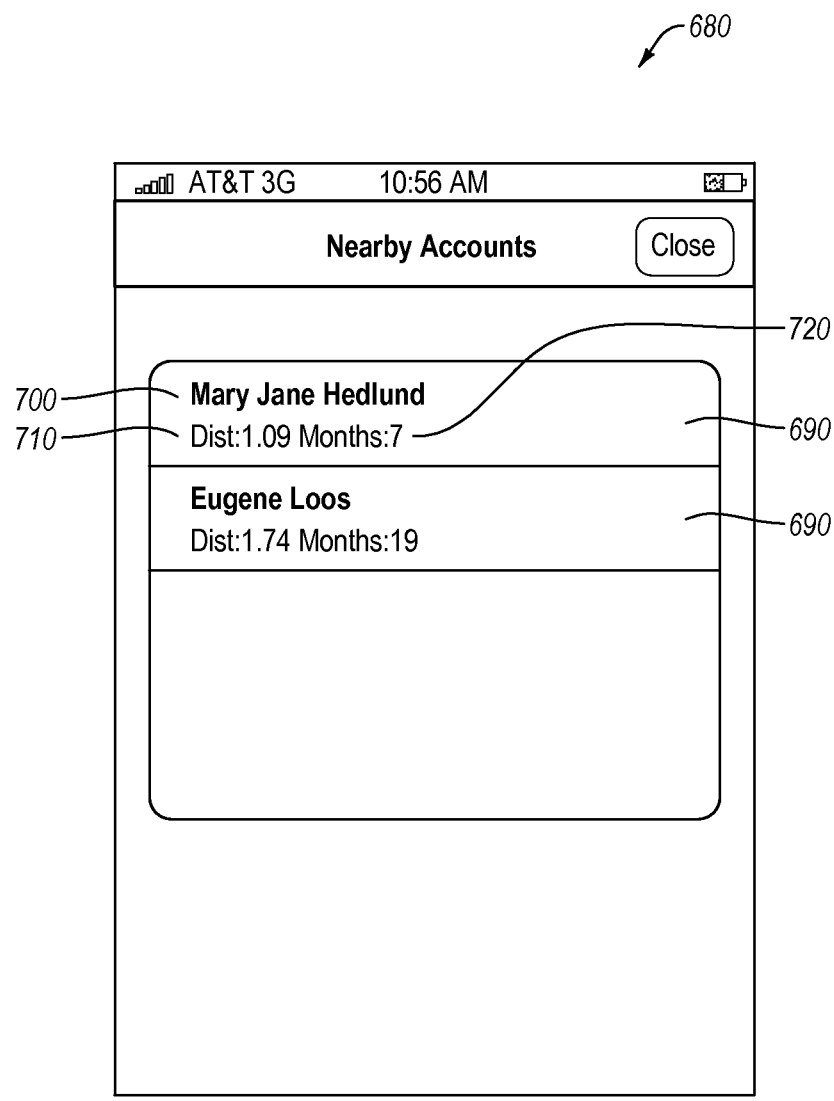
FIG. 14 shows a screenshot of a nearby accounts screen of a sales management tool.
Figure 15:
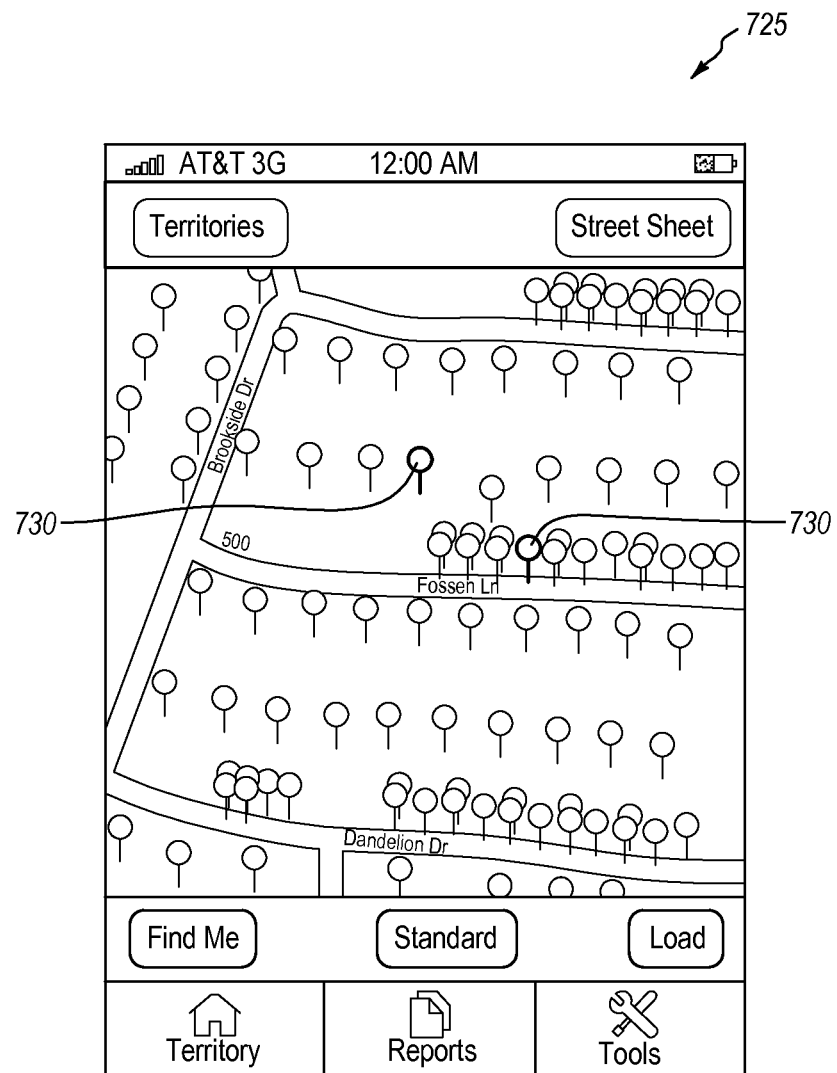
FIG. 15 shows a screenshot of a nearby accounts map screen of a sales management.

However, if the sales call approach is not immediately dismissed, the salesperson may request useful supporting information. In FIG. 14, the salesperson may retrieve nearby current accounts 690 as references as a current accounts list screen 680. In the event that a sales person represents a company who has existing or former customers in the near vicinity of where the sales person is currently working, it may be helpful to the sales person to know information about the nearby accounts, such as names 700, distance 710 and number of months 720 as a customer. The sales person may use their names for reference and creditability. If needed, the accounts may also be listed on a map screen 725 to gauge the proximity to the current sales opportunity, such as highlighted account pins 730 in FIG. 15.

Figure 16:
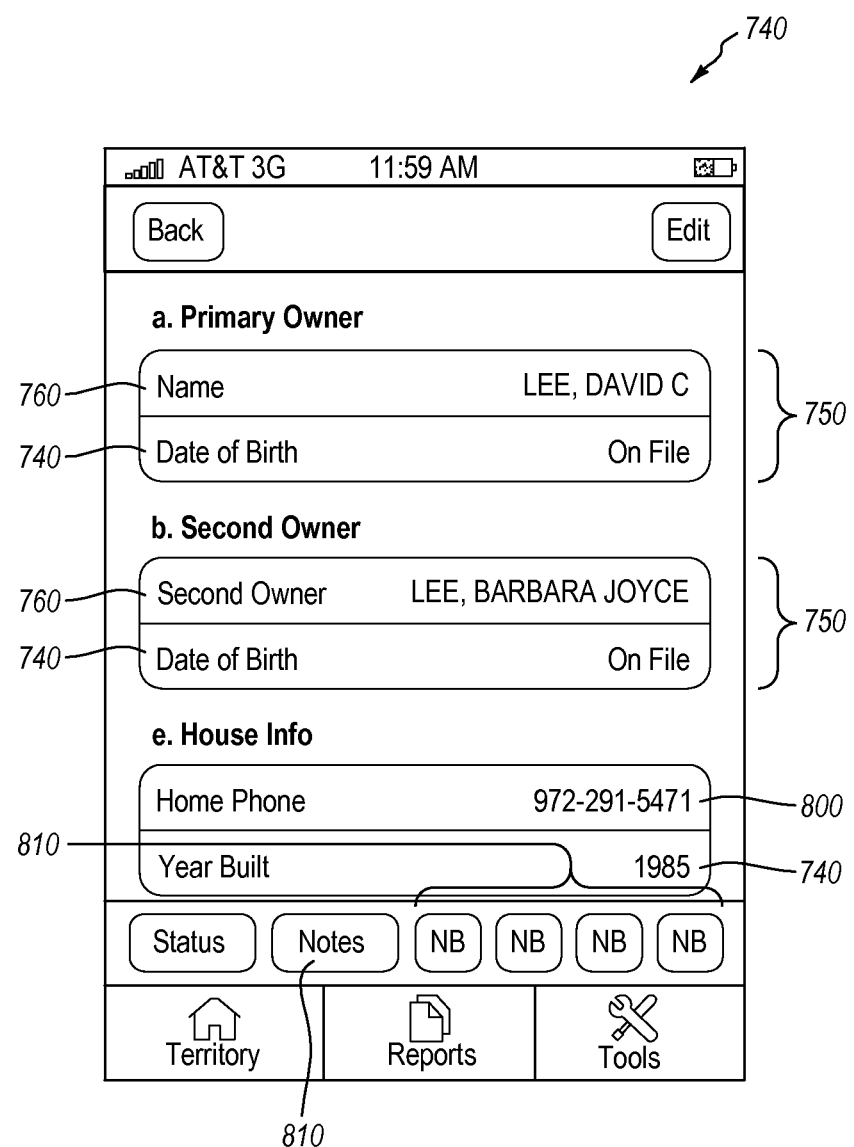
FIG. 16 shows a screenshot of a home information screen of a sales management tool.
Figure 17:
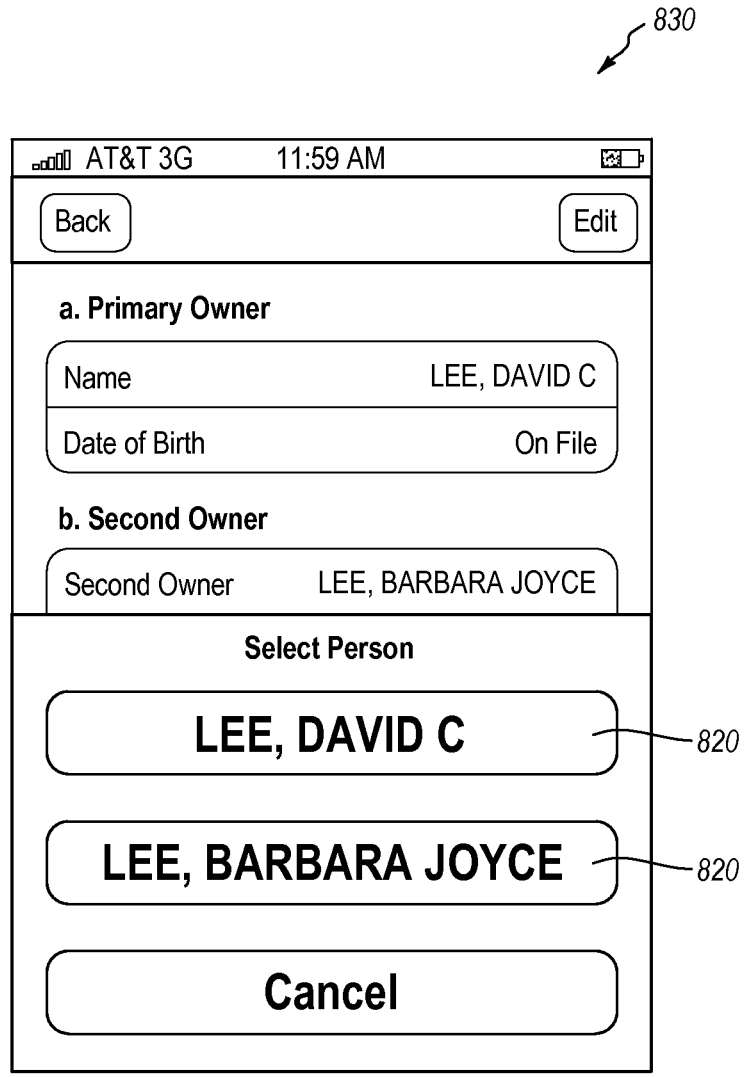
FIG. 17 shows a screenshot of a homeowner selection screen of a sales management tool.
Figure 18:
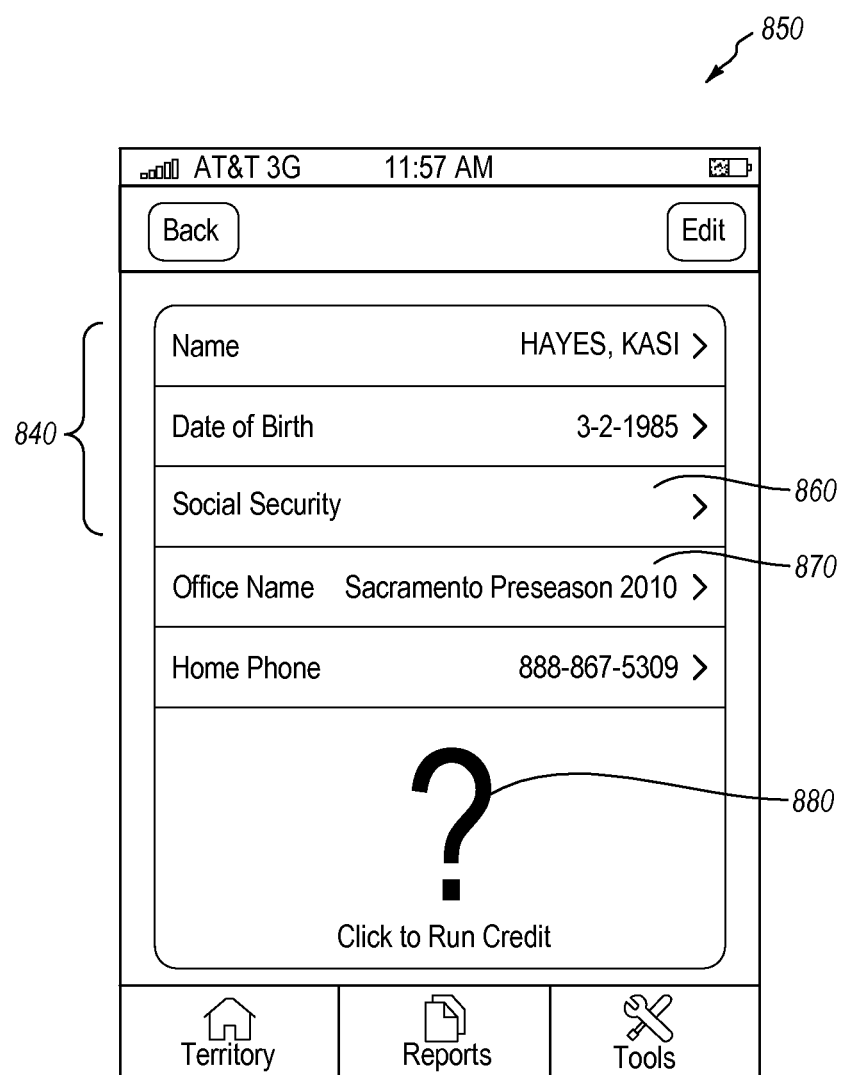
FIG. 18 shows a screenshot of a credit pre-qualification screen of a sales management tool.

If needed, the salesperson may call up an information screen 740 on the expected residents of the home, such as in FIG. 16. This screen may be gathered from a mix of public and private databases. For instance, the home address information may be used to identify the residents 750, and then the residents' names 760 may be used to look up information about them personally 780. This information may also include information that helps the sales person close the sale. In some cases, the important information may be highlighted, such as reports of recent crimes in the area or that house specifically. In other cases, the information may be present, such as the build date of the house 790 or expected phone number 800. If needed, the salesperson may take notes or request further reports 810. These reports 810 may require an extra request because the report costs money.

For example, if the salesperson decides that the current sales opportunity is promising, the salesperson may request a pre-qualification of at least one of the residents. Using the information retrieved previously about the expected residents, the salesperson may select a resident 820 from the resident selection screen 830 shown in FIG. 17 and automatically include the currently known information 840 into the pre-qualification screen 850 shown in FIG. 18. If changes are required, the salesperson may select individual items to correct. Sensitive information may be hidden or restricted from the sales people, including social security numbers 860. However, in the event of a request failure, the salesperson may be permitted to enter new information, without access to the original information. Similarly, cost attribution information 870 or other accounting information may be entered. Otherwise, the salesperson may select the pre-qualification button 880 to run the pre-qualification.

Figure 19:
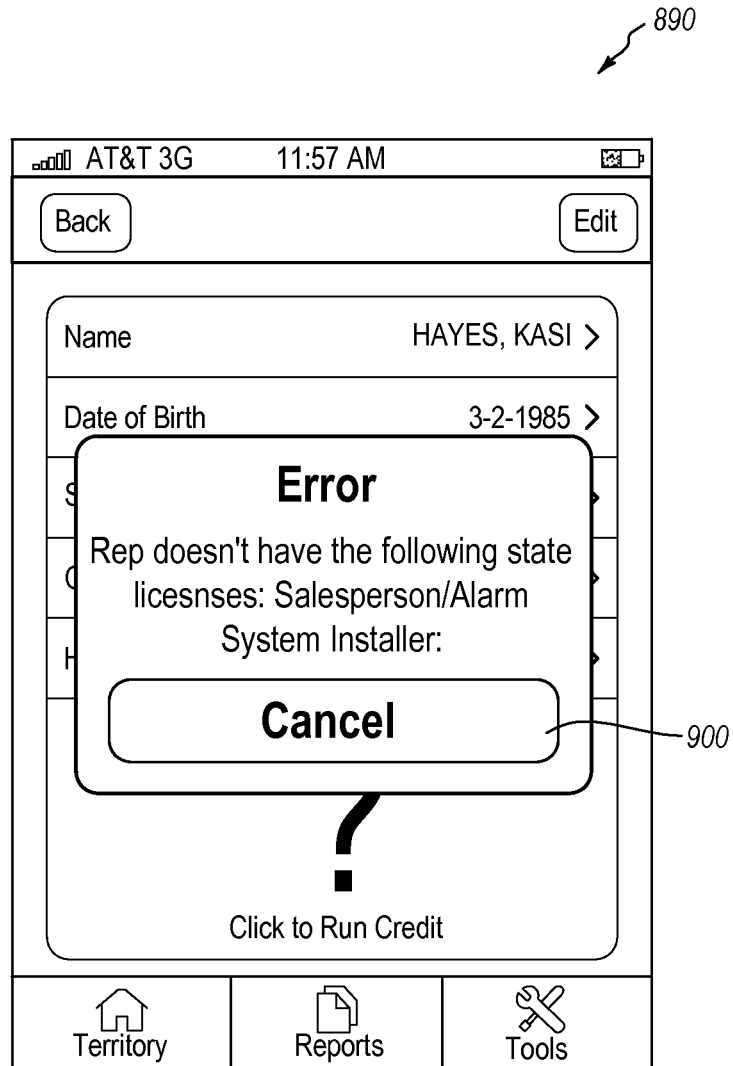
FIG. 19 shows a screenshot of a validation screen of a sales management tool.

The system may include checks and verifications to enforce compliance with policy or law. In some cases, it may be useful to restrict a salesperson from closing a sale. In some cases it is useful to restrict salespeople who are not licensed in the state from completing a sale. In FIG. 19, the compliance screen 890 is a method to restrict the pre-qualification ability to people with state licenses. A pop-up 900 is shown with an explanation relating to the noncompliance reason. In this case, if the pre-qualification screen cannot be run, the sale cannot be completed. The unlicensed salesperson would have to request a licensed person to complete the sale.

Figure 20:
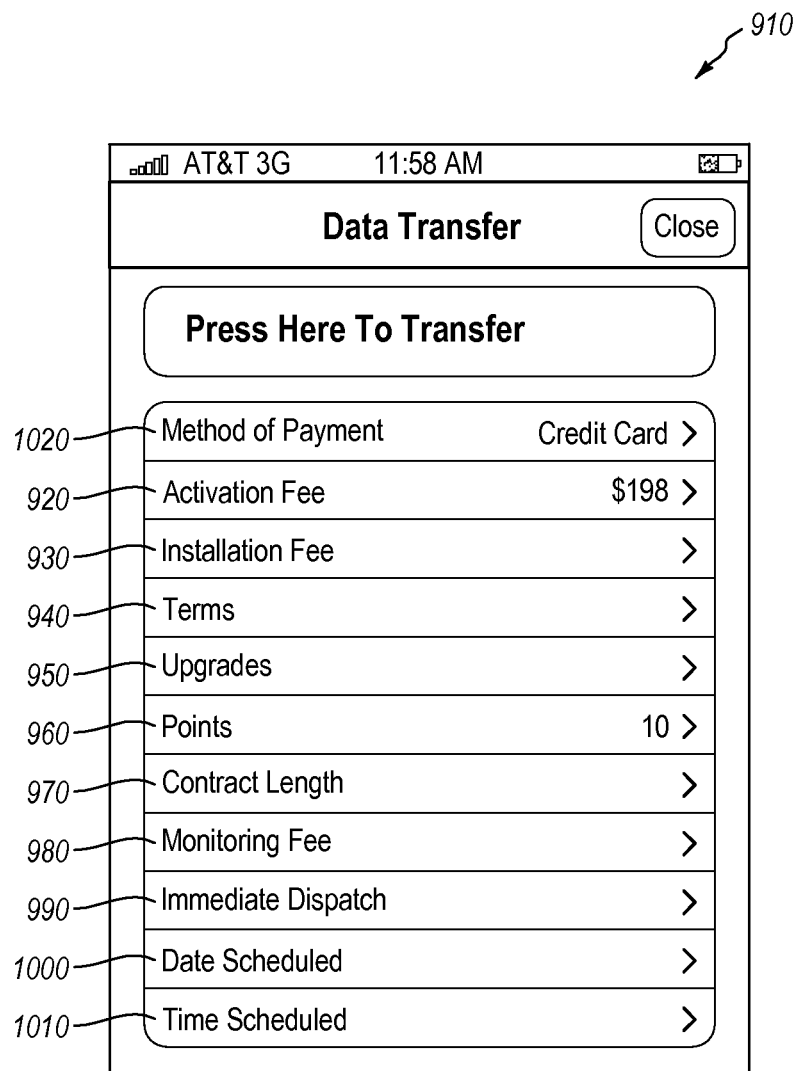
FIG. 20 shows a screenshot of a deal closing screen of a sales management tool.

Once the resident has passed pre-qualification, the salesperson may work out the terms of the sale, such as seen in the terms of sale screen 910 in FIG. 20. This may include activation fees 920, installation fees 930, terms 940, upgrades 950, points 960, contract length 970, monitoring fees 980, immediate dispatch 990, installation date scheduling 1000, installation time scheduling 1010 or other important data. Once complete, the salesperson may also arrange to take payment 1020 for any deposit or fees owing, by inputting the information in the mobile device. In some cases, the payment may be immediately processed.

Figure 21:
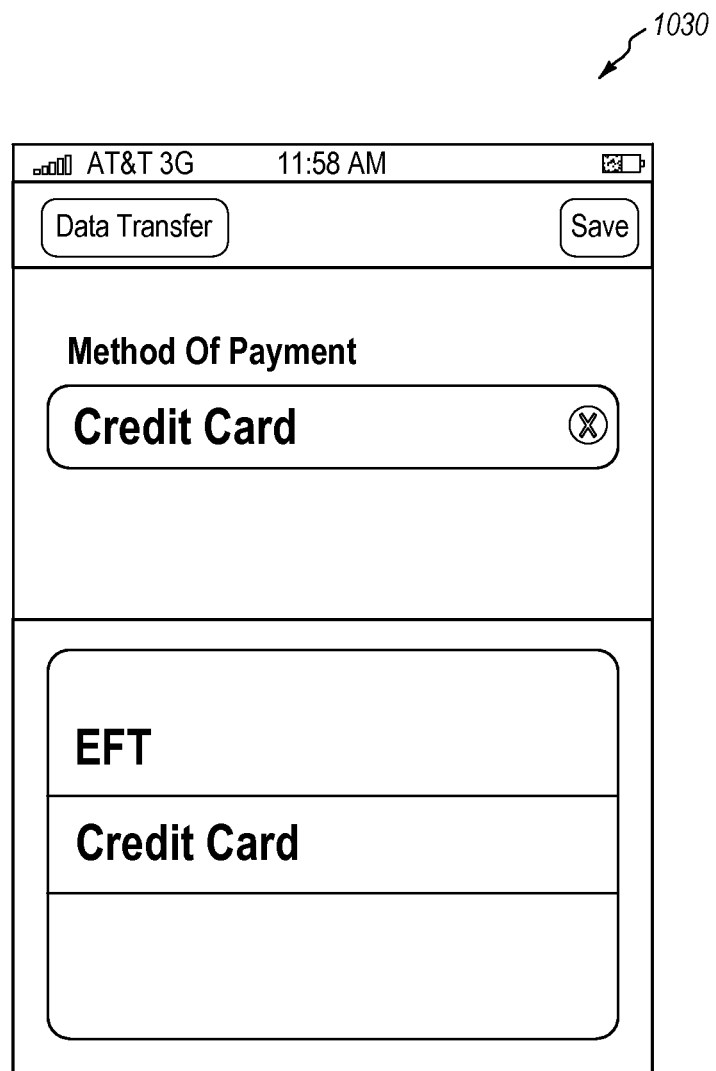
FIG. 21 shows a screenshot of a payment selection screen of a sales management tool.
Figure 22:
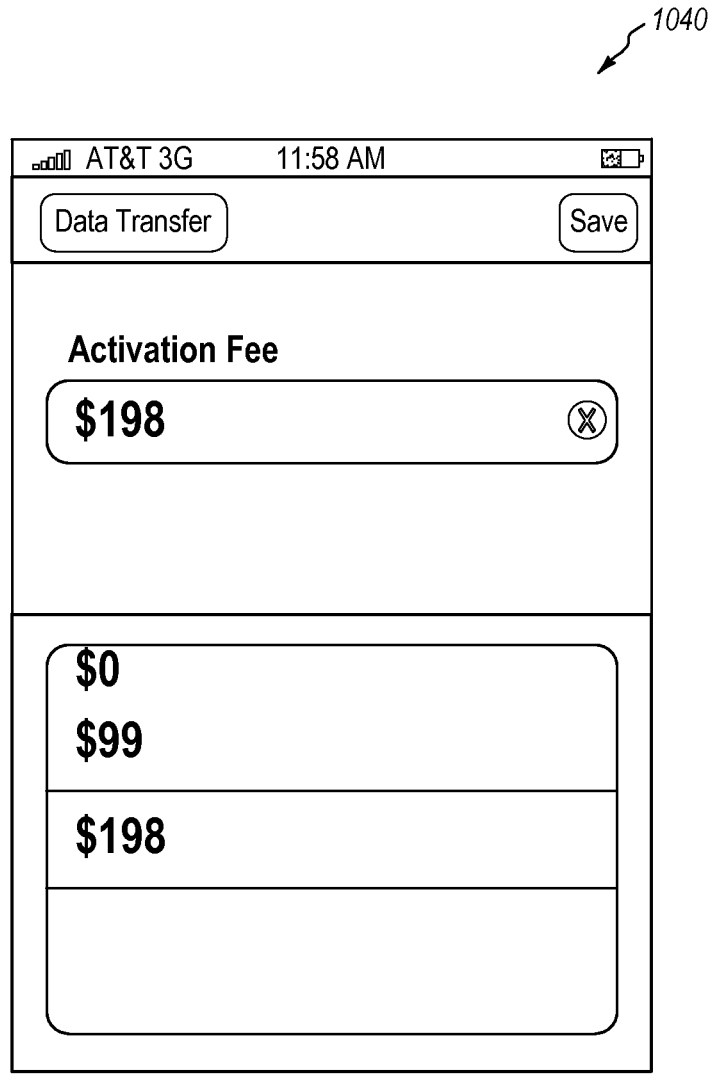
FIG. 22 shows a screenshot of a activation fee selection screen of a sales management tool.
Figure 23:
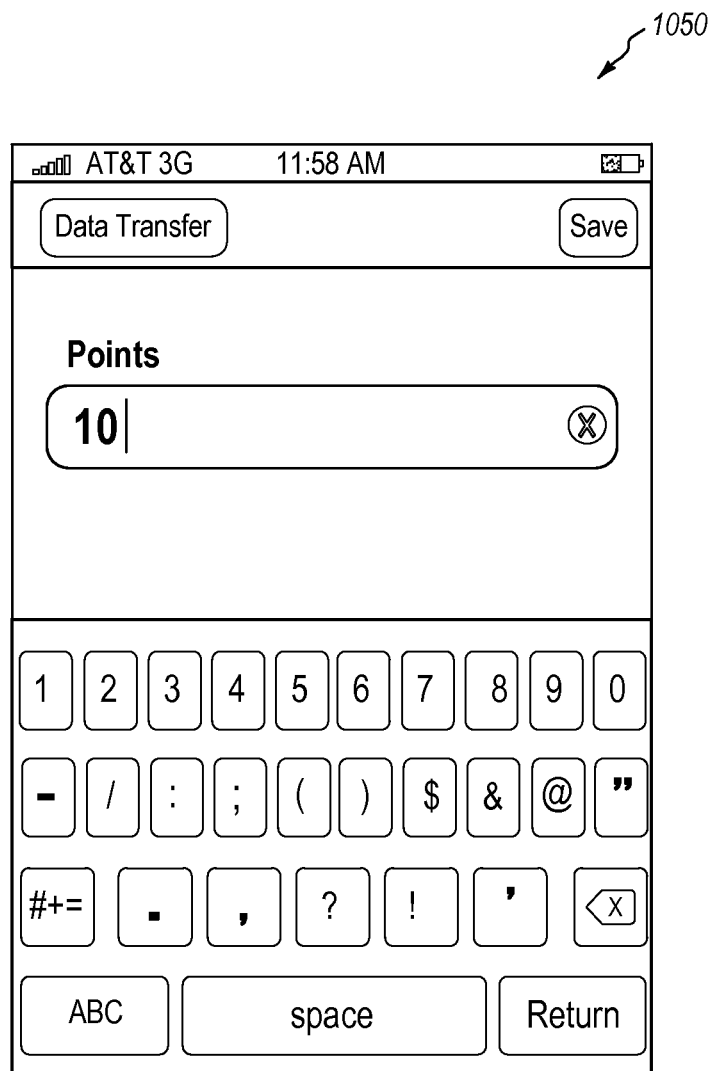
FIG. 23 shows a screenshot of a points selection screen of a sales management tool.
Figure 24:
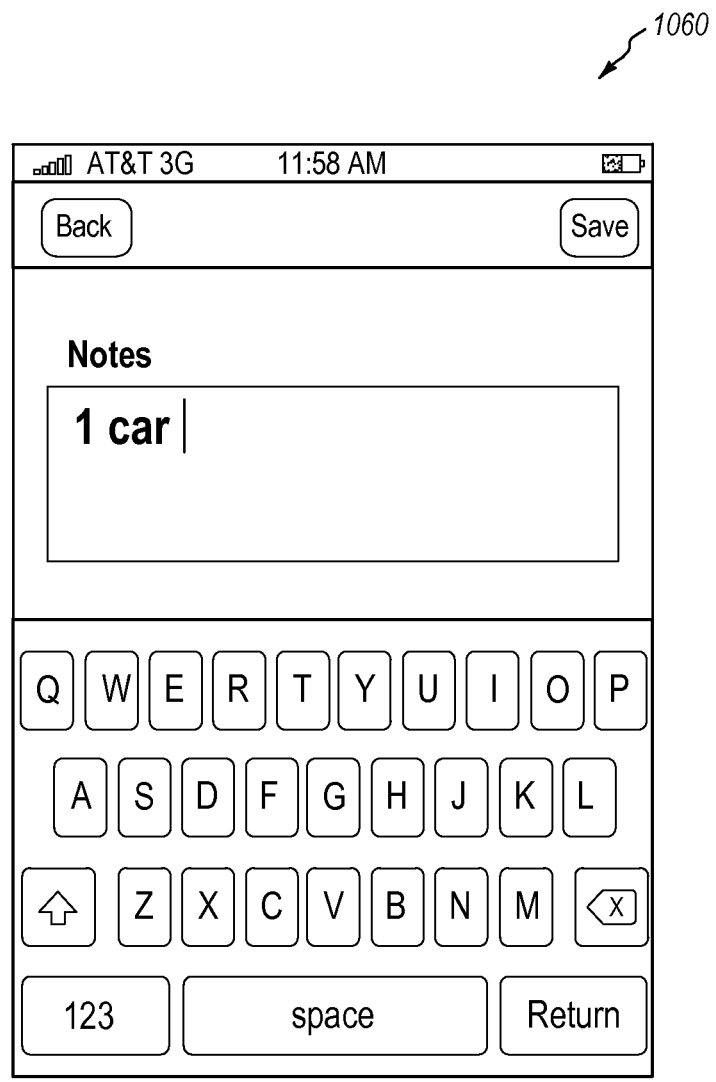
FIG. 24 shows a screenshot of a notes screen of a sales management tool.

FIGS. 21 to 24 show different methods of imputing and restricting input to the terms of sale. For example, the payment screen 1030 payment types may be restricted to specific cards, credit cards or EFT, as shown in FIG. 21. Similarly, the activation fee screen 1040 may be restricted to authorized activation fee levels, as shown in FIG. 22. However, a more generic input may be desired for other input, such as in the points screen 1050 for points, in the case of alarm installation sales, as shown in FIG. 23. Similarly, FIG. 24, shows a notes screen 1060 with generic input for notes on the sales opportunity.

Figure 25:
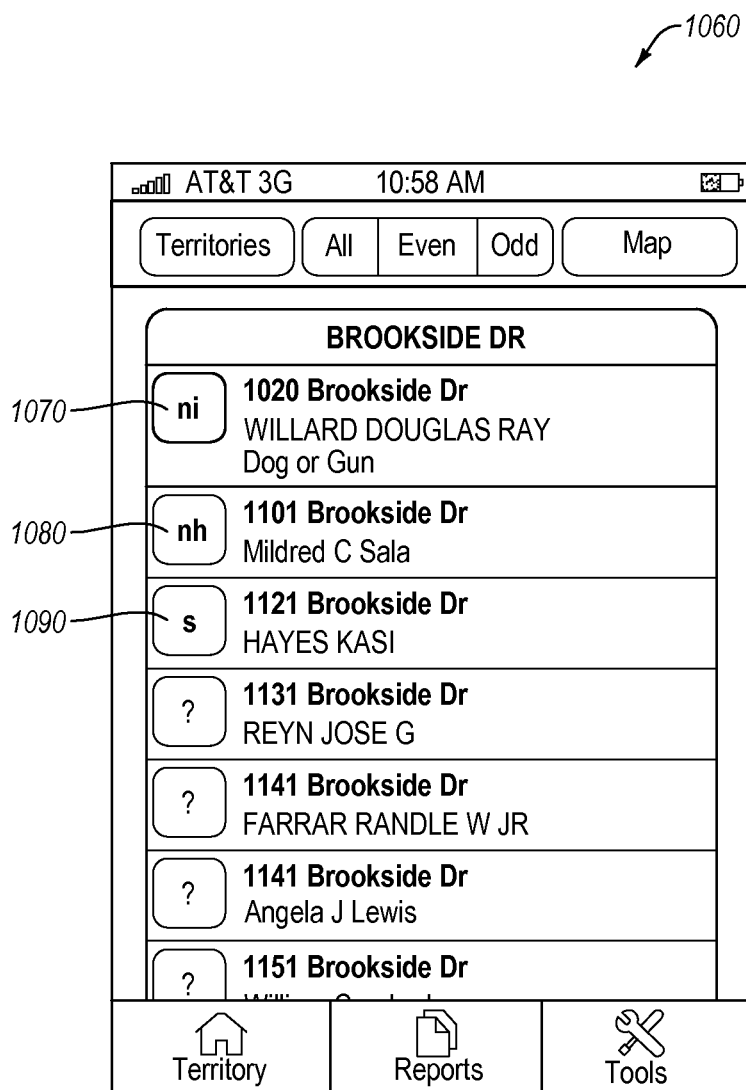
FIG. 25 shows a screenshot of a street sheet screen with multiple results of a sales management tool.
Figure 26:
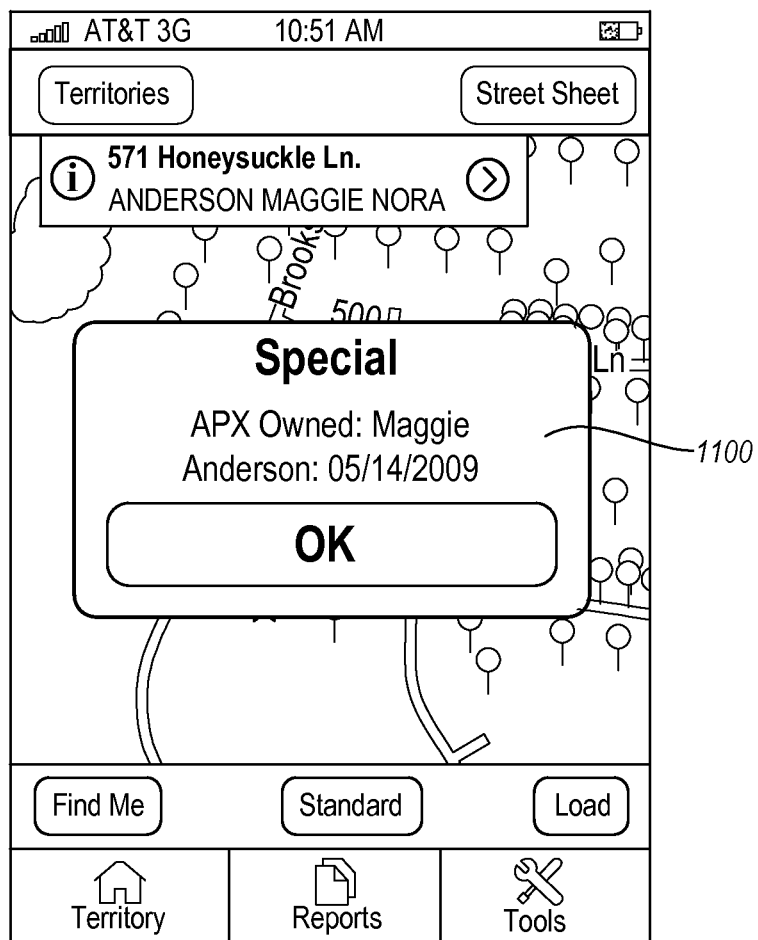
FIG. 26 shows a screenshot of an information popup screen of a sales management tool.

Once complete, the salesperson may return to the neighborhood listing, as shown in FIG. 25. Here, the updated street sheet 1060 has been updated with the sales person's activity. The first home 1070 remains marked as not interested with a reason of a dog or gun. The second home 1080 was marked as not home and the recently completed sale 1090 was marked as well.

The system may also contain logic to prevent salespeople from performing unauthorized action. For instance, if the sales person tries to request for information on a current customer, the system may show an error message pop-up 1100 such as in FIG. 26. Similar restrictions may apply for other homes or information. For instance, the system may prevent contact with people who declared they were not interested for a period of time, such as one year. It may also prevent contact with people known to be under contract with another company until the contract is up. The system may also provide safety warnings, such as entering a dangerous neighborhood or attempting a sales call on a previously marked violent or threatening homeowner.

Figure 27:
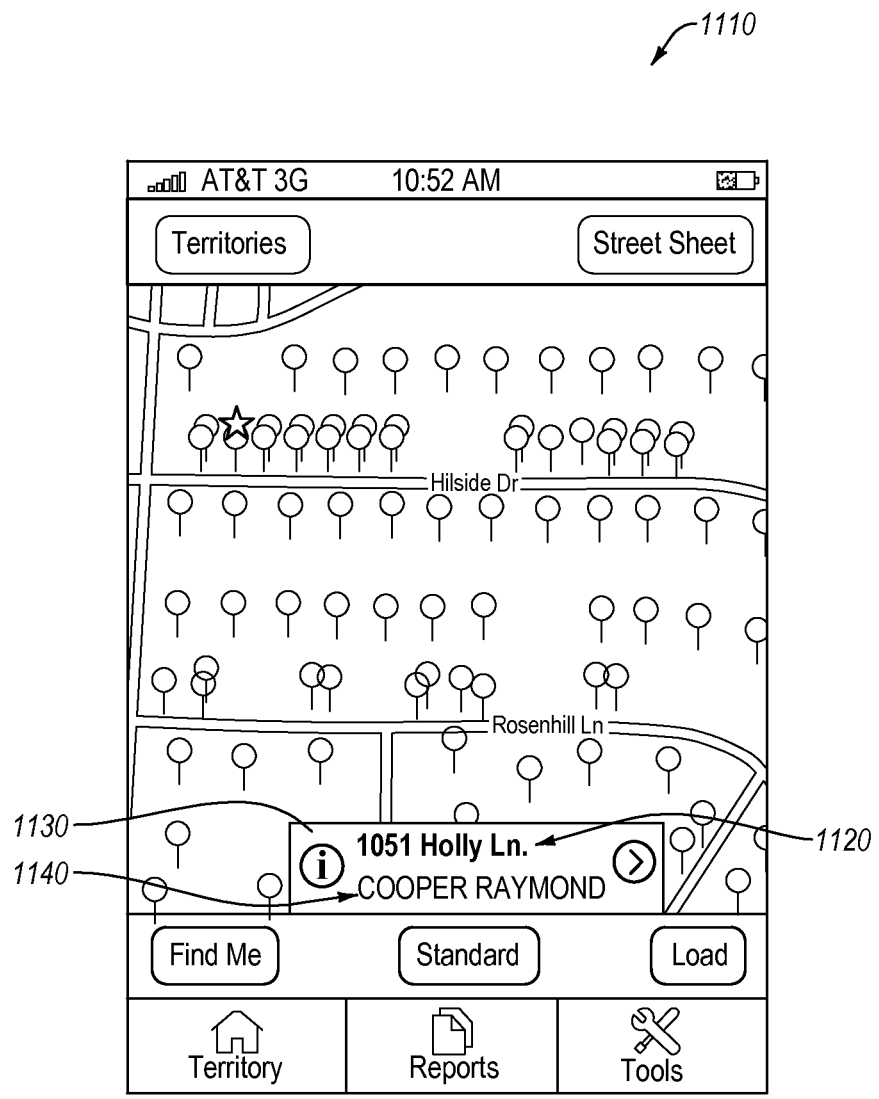
FIG. 27 shows a screenshot of a location finding map screen of a sales management tool.
Figure 28:
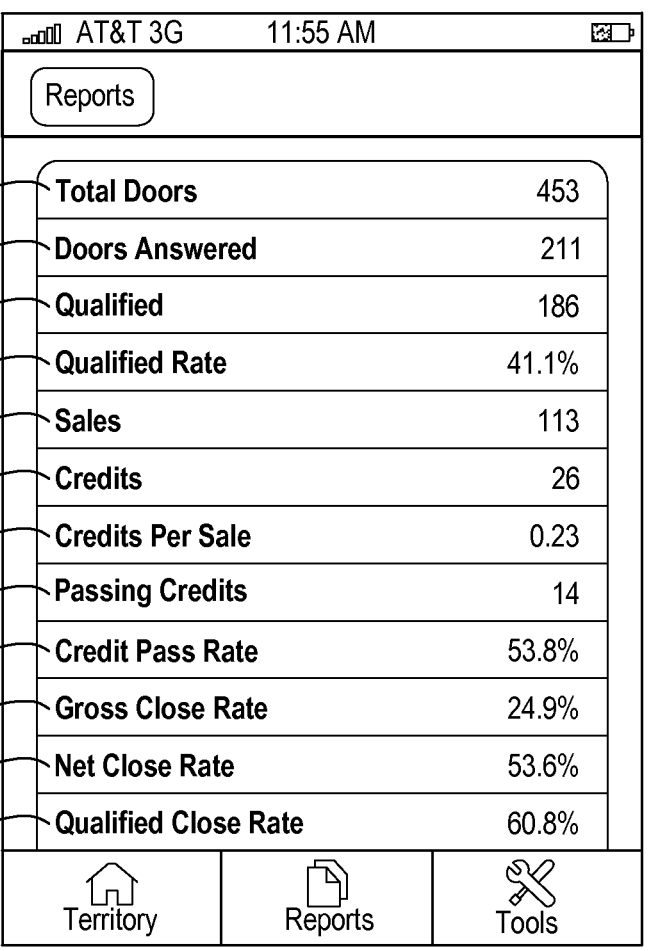
FIG. 28 shows a screens hot of an overall report screen of a sales management tool.

The system may also allow the salesperson to search and/or scroll through homes and/or owner names. FIG. 27 shows a screenshot of a house id map screen 1110 marking a currently identified home 1120 with an address listing 1130 and homeowner name 1140.

The system may also allow the salesperson or sales manager to run reports and/or receive reports on their mobile device. As seen FIG. 28, a breakout report 1150 may contain information on the total number of doors attempted 1160, the number of people who answered 1170, the number of people passing pre-qualification 1180, the passing rate for pre-qualification 1190, the number of sales 1200, the number of credits 1210, the number of credits per sale 1220, the number of credits that pass 1230, the passage rate of credits 1240, the rate of closing in gross 1250 and net 1260, and rate of closing for those that pre-qualify 1270. These statistics may be adjusted by various ranges, including date, time of day, day of week, salesperson, group of sales people, neighborhood, proximity to event (such as recent crime) or other ranges.

Figure 29:
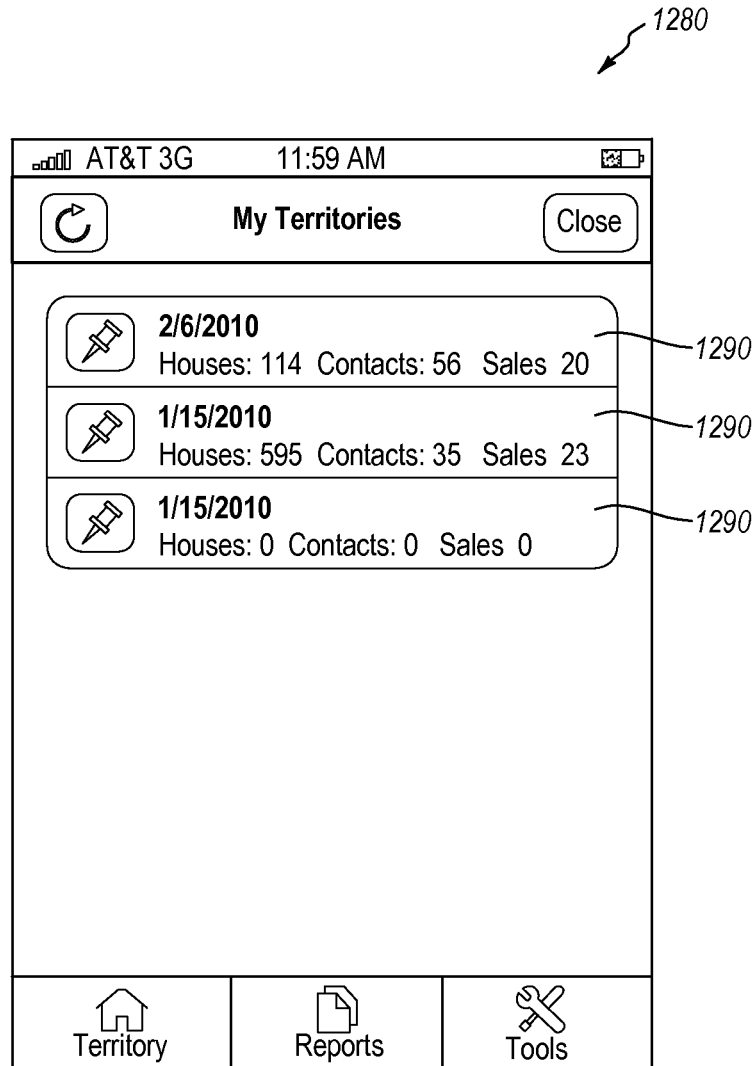
FIG. 29 shows a screenshot of a territory report screen of a sales management tool.
Figure 30:
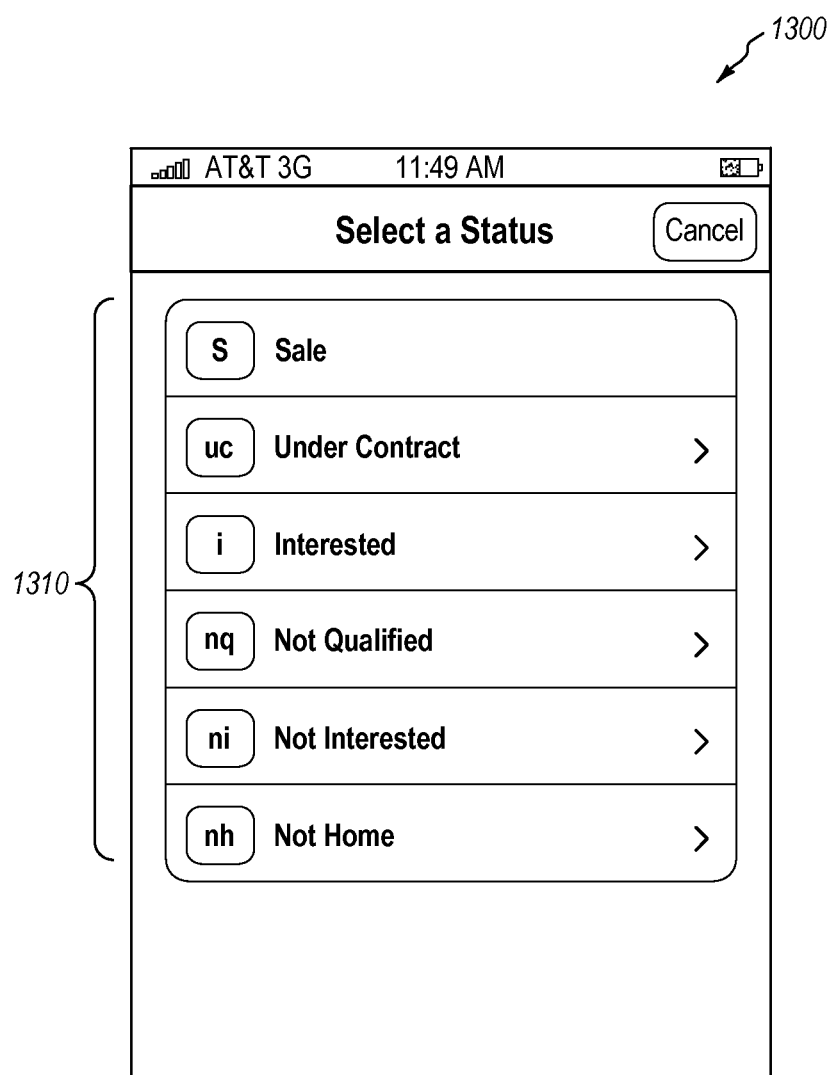
FIG. 30 shows a screenshot of a status request report screen of a sales management tool.
Figure 31:
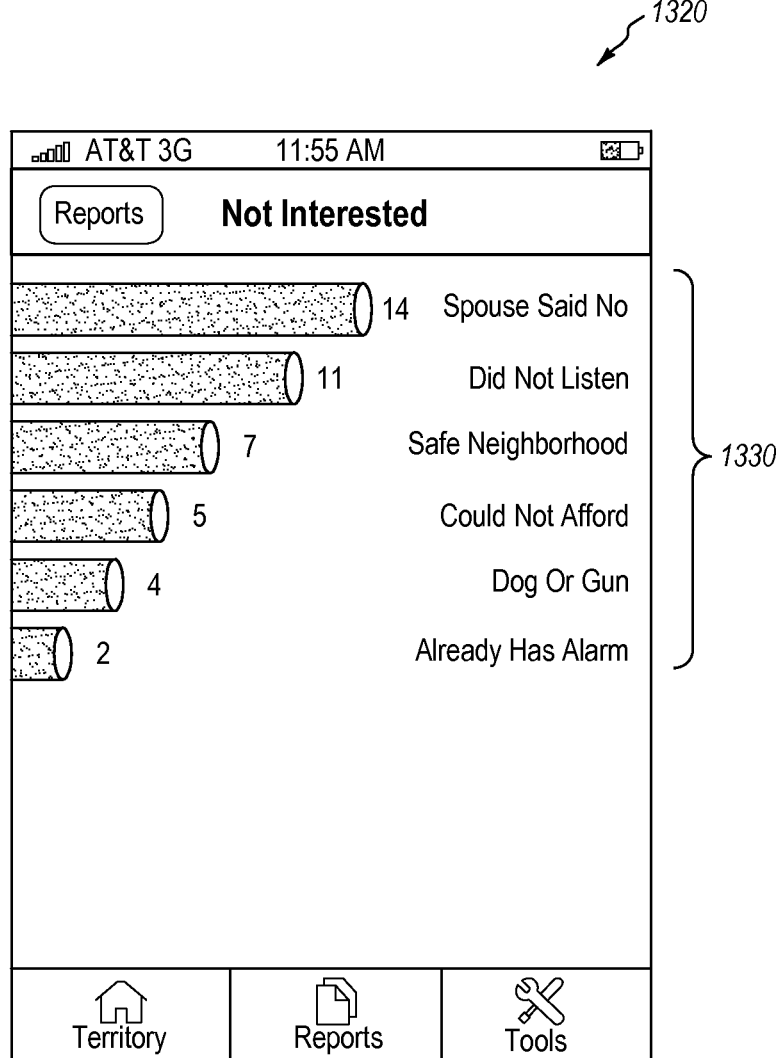
FIG. 31 shows a screenshot of a status of not interested report screen of a sales management tool.
Figure 32:
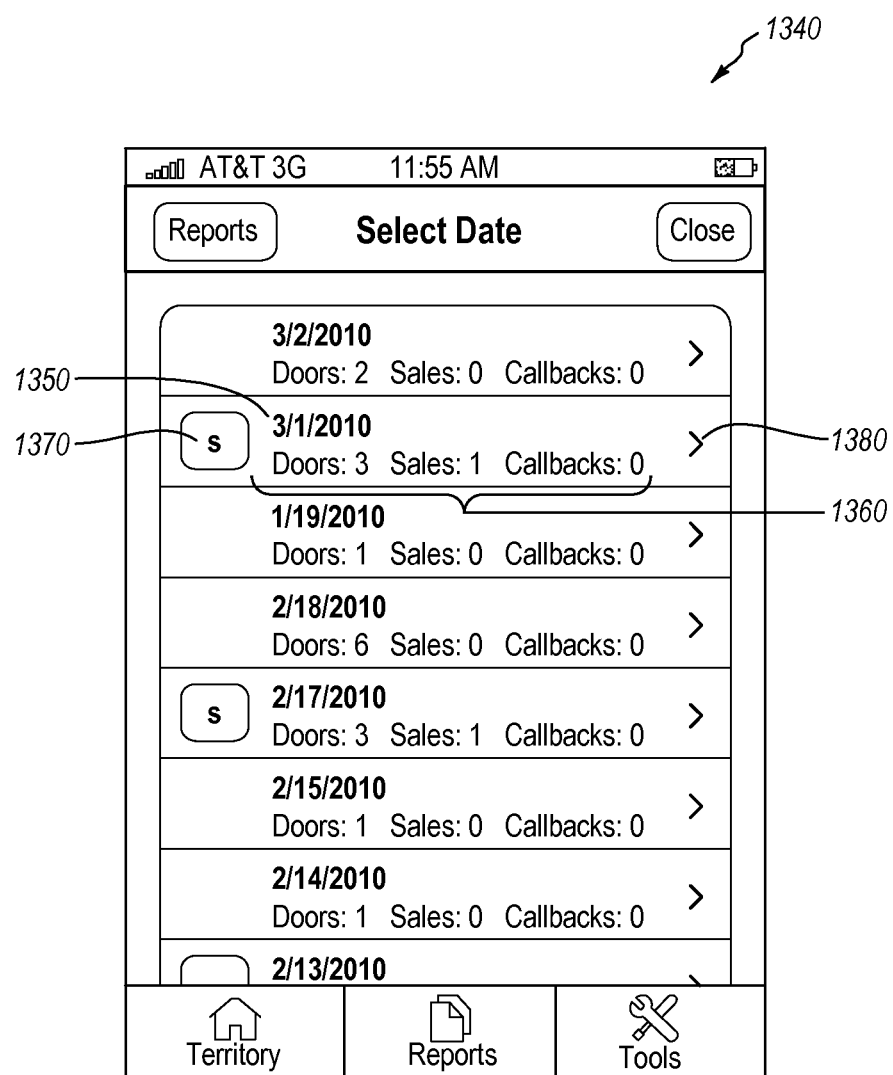
FIG. 32 shows a screenshot of a date report screen of a sales management tool.

Various sub-reports may be selected and viewed as well. FIG. 29 shows a summary statistics screen 1280 for a sales manager's various territories, which may drill down into further sub-reports 1290. For example, a sub-report selection screen 1300 may include a report based on house status 1310 as seen in FIG. 30. A sales manager may review a graphing screen 1320 of the more common "not interested" status reasons 1330 as shown in FIG. 31 and arrange training to overcome the reasons. The reports may contain various granularity and summary screens. For instance, a sales manager or sales person may browse the sales by date. In FIG. 32, a sales person may browse their sales history by date in a sales browsing screen 1340. Each date 1350 shows a summary statistics 1360 for that day along with a sales icon 1370 identifying days with sales.

It should be recognized that screens and reports may be linked. For instance, in FIG. 32, the statistics are summarized for each date. However, a sales person or manager may select the arrow 1380 to drill down further into the report and see more granular results.

There is thus disclosed an improved sales management tool and associated methods of use. It will be appreciated that numerous changes may be made to the present invention without departing from the scope as defined by the claims.

What is claimed is:

1. A computer-implemented method for facilitating the identification of sales targets, the computer-implemented method comprising:
    displaying in a graphical user interface ("GUI") an image of a map of a sales region on an electronic display of a mobile device, the sales region image map based on a geographic location of the mobile device;
    displaying in the GUI a plurality of selectable icons depicted on the map and each corresponding to a geographic location of a potential sales target within the sales region;
    in response to a selection of a particular one of the plurality of selectable icons, displaying in a location of the screen a first GUI window, the first GUI window including sales information associated with the potential sales target associated with the selected icon; and
    wherein at least one of the plurality of selectable icons is associated with a visually distinct characteristic, distinguishing it from at least one other of the plurality of selectable icons based on a predicted higher potential success rate for a sale.

2. The method of claim 1, wherein the sales information comprises a name of an occupant of a dwelling associated with the potential sales target associated with the selected icon.

3. The method of claim 1, wherein the sales information comprises existing account information associated with the potential sales target associated with the selected icon.

4. The method of claim 1, wherein the sales information comprises a credit score associated with an occupant of a dwelling associated with the potential sales target associated with the selected icon.

5. The method of claim 1, wherein the sales information comprises demographic information associated with an occupant of a dwelling associated with the potential sales target associated with the selected icon.

6. The method of claim 1, wherein the sales information comprises information about a current account located within the sales region and different from the potential sales target associated with the selected icon.

7. The method of claim 1, wherein the sales information comprises record inspection data relevant to ancillary products or services associated with the potential sales target associated with the selected icon.

8. The method of claim 1, wherein the sales information comprises previous sales call information obtained in connection with the potential sales target associated with the selected icon.

9. The method of claim 8, wherein the previous sales call information comprises profitability information associated with a previous sale.

10. The method of claim 8, wherein the previous sales call information comprises historical difficulty information associated with a previous sale.

11. The method of claim 8, wherein the previous sales call information comprises safety information associated with a previous sale.

12. The method of claim 1, wherein the sales information comprises an error message displayed in a second GUI window, the error message associated with the potential sales target associated with the selected icon.

13. The method of claim 12, wherein the error message comprises information that prevents a visit to the sales target associated with the selected icon.

14. The method of claim 13, wherein the error message comprises policy compliance information that prevents a visit to the sales target associated with the selected icon by a user of the mobile device.

15. The method of claim 1, further comprising providing a database, residing on a server and connected to the mobile device over a network, the database comprising sales information for at least some of the potential sales targets within the sales region and wherein upon selection of a particular one of the plurality of selectable icons, the database is queried over the network and the sales information is forwarded to the mobile device via the network.

16. The method of claim 1, wherein the visually distinct characteristic is selected to convey sales information associated with the corresponding potential sales target.

17. The method of claim 1, wherein the visually distinct characteristic is a visually distinct color.

18. The method of claim 1, wherein the visually distinct characteristic is a visually distinct shape.

19. A system for facilitating sales, the system comprising:
    a database, residing on a server, comprising sales information for a plurality of potential sales targets, where each of the plurality of sales targets is associated with a geographic sales region;
    a plurality of mobile devices, each associated with a sales associate and comprising:
        an electronic display; and
        a geolocation device configured to determine a geographic location of the respective mobile device;
    one or more electronic storage devices comprising software instructions which, when executed by one or more processors, configure the one or more processors to:
    receive over a network by the server, a geographic location of a respective one of the plurality of mobile devices from the geolocation device of the respective mobile device;
    query the database by the one or more processors to identify each of the plurality of potential sales targets associated with the geographic sales region within a predetermined distance from the determined geographic location of the respective mobile device;

generate a first graphical user interface ("GUI") at the electronic display of the respective mobile device comprising a map and selectable icons depicted on the map at positions corresponding with the geographic location of the identified potential sales targets;

upon selection of one of the selectable icons, query the database to retrieve the sales information associated with the potential sales target associated with the selected one of the selectable icons;

display in a second GUI, a visualization of the retrieved sales information associated with the potential sales target associated with the selected one of the selectable icons;

receive data from the respective mobile device indicating a visit to the potential sales target associated with the selected one of the selectable icons;

receive inspection data entered by the sales associate associated with the respective mobile device, the inspection data associated with the potential sales target visited by the sales associate; and update the database to indicate the visit to the potential sales target by the sales associate and with the inspection data.

20. The system of claim 19, wherein:

the one or more electronic storage devices and the one or more processors are provided at each of the plurality of mobile devices.

21. The system of claim 19, further comprising:

a remote server, wherein the one or more electronic storage devices and the one or more processors are located at the remote server.

22. The system of claim 19 further comprising:

additional software instructions stored at the one or more electronic storage devices, which when executed by the one or more processors, configures the one or more processors to:

receive data from the respective mobile device indicating a visit to the potential sales target associated with the selected one of the selectable icons; and update the database to indicate the visit to the potential sales target by a sales associate associated with the respective mobile device.

23. The system of claim 19, further comprising:

additional software instructions stored at the one or more electronic storage devices, which when executed by the one or more processors, configures the one or more processors to generate a visualization at a third GUI for the respective mobile device, where the visualization comprises summary information, the summary information comprising a summary of sales information for the geographic sales region.

24. The system of claim 23, wherein the visualization comprises one or more visual graphs.

25. The system of claim 23, wherein the summary information is selectable, wherein upon selection of the summary information causes a display in a fourth GUI, a visualization displaying the information associated with the selected summary information.

26. A method for facilitating effective sales, the method comprising the steps of:

providing a database, residing on a server, comprising sales potential data for a plurality of sales targets, where each of the plurality of sales targets is associated with a geographic location, potential revenue information, and sales representative information including information relating to sales representative visits to at least some of the plurality of sales targets;

receiving, over a network by the server, a geographic location from a mobile device having a geolocation location device;

querying the database, by one or more processors, to identify each of the plurality of sales targets associated with a geographic location within a distance from the received geographic location of the mobile device;

generating a graphical user interface ("GUI") at an electronic display for the mobile device, the GUI comprising a map and one or more selectable icons depicted on the map at positions corresponding with the geographic locations of each of the identified sales targets wherein at least one of the selectable icons is associated with a visually distinct characteristic, distinguishing it from at least one other selectable icons based on a predicted higher potential success rate for a sale;

upon selection of one of the selectable icons on the GUI:
  querying the database, by the one or more processors, to retrieve the sales potential data associated with the sales target associated with the selected one of the selectable icons; and
  generating, in a second GUI, a visualization of the retrieved sales potential data information associated with the sales target associated with the selected one of the selectable icons.

* * * * *